(12) United States Patent
Romerein et al.

(10) Patent No.: US 12,044,896 B2
(45) Date of Patent: Jul. 23, 2024

(54) CABLE DEMARCATION ENCLOSURE

(71) Applicant: Times Fiber Communications Inc., Wallingford, CT (US)

(72) Inventors: Robert L. Romerein, Ontario (CA); Brian J. Shapson, Jackson, NJ (US)

(73) Assignee: TIMES FIBER COMMUNICATIONS INC., Wallingford, CT (US)

( * ) Notice: Subject to any disclaimer, the term of this patent is extended or adjusted under 35 U.S.C. 154(b) by 165 days.

(21) Appl. No.: 17/592,272

(22) Filed: Feb. 3, 2022

(65) Prior Publication Data
US 2022/0244478 A1    Aug. 4, 2022

Related U.S. Application Data

(60) Provisional application No. 63/145,456, filed on Feb. 3, 2021.

(51) Int. Cl.
*G02B 6/00* (2006.01)
*G02B 6/44* (2006.01)
*H02G 3/08* (2006.01)

(52) U.S. Cl.
CPC ........... *G02B 6/445* (2013.01); *G02B 6/4452* (2013.01); *G02B 6/4457* (2013.01); *H02G 3/083* (2013.01)

(58) Field of Classification Search
CPC .... G02B 6/445; G02B 6/4452; G02B 6/4457; G02B 6/00; H02G 3/083; H02G 3/081
See application file for complete search history.

(56) References Cited

U.S. PATENT DOCUMENTS

| 9,329,352 B2 | 5/2016 | Campos et al. |
| 2008/0292261 A1* | 11/2008 | Kowalczyk .......... G02B 6/4478 242/169 |
| 2009/0047828 A1* | 2/2009 | Sparrowhawk ........ H02G 3/083 439/535 |

OTHER PUBLICATIONS

FTTH FLEXdrop Deploy Reel from Clearfield, https://vimeo.com/286367306/22026e9a64 accessed Feb. 2, 2022.

* cited by examiner

*Primary Examiner* — Jennifer Doan
(74) *Attorney, Agent, or Firm* — Kunzler Bean & Adamson

(57) ABSTRACT

Disclosed herein is a demarcation enclosure that includes a base. The base includes an interior cavity. The demarcation enclosure also includes a cover that selectively encloses the base. The demarcation enclosure further includes a tray that is removably attachable to the base, within the interior cavity of the base, and that includes a mounting plate. The mounting plate has a first side and a second side that is opposite the first side. The tray further includes an outer ring coupled to and protruding from the second side of the mounting plate, and an axle coupled to and protruding from the second side of the mounting plate at a center of the outer ring.

21 Claims, 14 Drawing Sheets

CABLE DEMARCATION ENCLOSURE

CROSS-REFERENCE TO RELATED APPLICATION

This application claims the benefit of U.S. Provisional Patent Application No. 63/145,456, filed Feb. 3, 2021, which is incorporated herein by reference in its entirety.

FIELD

This disclosure relates generally to communication systems, and more particularly to connections between cables of a public communication network and a private communications network.

BACKGROUND

Cables of a public communication network are connected to cables of a private communication network at a demarcation point. The demarcation point is located at the premises of a customer or end user, and defines a transition from the public communication network to the private communication network. Various hardware, such as terminal blocks, signal splitters, surge protectors, amplifiers, and the like, facilitates this transition between a provider cable of the public communication network and a user cable of the private communication network. Housing the various hardware in an enclosure helps protect the hardware from the environment and from tampering.

To ensure the provider cable is long enough to reach the demarcation point and to provide excess provider cable for future repairs or maintenance, the provider cable provided at the customer's premises is often longer than necessary. Conventionally, excess length of the provider cable is stripped and stored at the premises of the customer separately from the enclosure. Stripping the provider cable is tedious and time-consuming. Moreover, storing the excess provider cable can be inconvenient and take up valuable storage space.

SUMMARY

The subject matter of the present application has been developed in response to the present state of the art, and in particular, in response to the problems and needs of conventional cable demarcation enclosures. In view of the foregoing, the subject matter of the present application has been developed to provide a cable demarcation enclosure, and corresponding selectively attachable tray, that overcome at least one of the shortcomings of the prior art.

The following is a non-exhaustive list of examples, which may or may not be claimed, of the subject matter, disclosed herein.

Disclosed herein is a demarcation enclosure. The demarcation enclosure comprises a base, comprising an interior cavity. The demarcation enclosure also comprises a cover, selectively enclosing the base. The demarcation enclosure further comprises a tray, removably attachable to the base, within the interior cavity of the base, and comprising a mounting plate, having a first side and a second side that is opposite the first side, an outer ring coupled to and protruding from the second side of the mounting plate, and an axle coupled to and protruding from the second side of the mounting plate at a center of the outer ring. The preceding subject matter of this paragraph characterizes example 1 of the present disclosure.

The outer ring comprises a cable inlet and is circumferentially closed except for the cable inlet. The preceding subject matter of this paragraph characterizes example 2 of the present disclosure, wherein example 2 also includes the subject matter according to example 1, above.

The cable demarcation enclosure further comprises a cable winder that is rotatably coupleable to the axle, such that when rotatably coupled to the axle the cable winder is rotatable relative to the outer ring. The preceding subject matter of this paragraph characterizes example 3 of the present disclosure, wherein example 3 also includes the subject matter according to any one of examples 1-2, above.

The cable winder comprises a spool. When the cable winder is rotatably coupled to the axle, the spool is located within the outer ring and is rotatable relative to the outer ring. The preceding subject matter of this paragraph characterizes example 4 of the present disclosure, wherein example 4 also includes the subject matter according to example 3, above.

The spool comprises a cable-retention channel sized to retain a network communications cable with an interference fit. The preceding subject matter of this paragraph characterizes example 5 of the present disclosure, wherein example 5 also includes the subject matter according to example 4, above.

The spool comprises a circular wall. Portions of the circular wall overlap each other. The cable-retention channel is defined between the portions of the circular wall that overlap each other. The preceding subject matter of this paragraph characterizes example 6 of the present disclosure, wherein example 6 also includes the subject matter according to example 5, above.

The cable winder further comprises an axle receptacle that is configured to receive the axle and is centered relative to the spool. The axle comprises resilient prongs that engage the axle receptacle to retain the axle receptacle on the axle. The resilient prongs are resiliently flexible to enable selective coupling of the cable winder to the axle and to enable selective decoupling of the cable winder from the axle. The preceding subject matter of this paragraph characterizes example 7 of the present disclosure, wherein example 7 also includes the subject matter according to any one of examples 4-6, above.

The axle receptacle comprises at least one notch. The at least one notch is configured to engage the resilient prongs such that rotation of the cable winder relative to the outer ring, in a winding direction, is un-obstructed and rotation of the cable winder relative to the outer ring, in an unwinding direction opposite the winding direction, is obstructed. The preceding subject matter of this paragraph characterizes example 8 of the present disclosure, wherein example 8 also includes the subject matter according to example 7, above.

The tray further comprises overhead retainers that are releasably coupleable with the mounting plate. The overhead retainers are releasably coupled with the mounting plate, the overhead retainers extend parallel with and offset from the second side of mounting plate and extend in a direction from the outer ring toward the axle. The preceding subject matter of this paragraph characterizes example 9 of the present disclosure, wherein example 9 also includes the subject matter according to any one of examples 3-8, above.

The first side of the mounting plate faces the cover and the second side faces away from the cover when the cover encloses the base and when the tray is attached to the base. When the tray is attached to the base, the tray divides the interior cavity into a first portion, in which the outer ring is located, and a second portion, in which the at least one electronic device is located. The preceding subject matter of this paragraph characterizes example 10 of the present disclosure, wherein example 10 also includes the subject matter according to any one of examples 1-9, above.

The base further comprises a service-provider-cable slot and a service-user-cable slot formed in the base. The service-provider-cable slot and the service-user-cable slot are open ended. The cover closes open ends of the service-provider-cable slot and the service-user-cable slot when the cover encloses the base. The preceding subject matter of this paragraph characterizes example 11 of the present disclosure, wherein example 11 also includes the subject matter according to any one of examples 1-10, above.

The cable demarcation enclosure further comprises a gasket in the interior cavity of the base and engaged with the service-provider-cable slot and the service-user-cable slot to seal off the service-provider-cable slot and the service-user-cable slot from the interior cavity of the base. The preceding subject matter of this paragraph characterizes example 12 of the present disclosure, wherein example 12 also includes the subject matter according to example 11, above.

The gasket comprises slits extending through a thickness of the gasket. A first one of the slits is aligned with the service-provider-cable slot. A second one of the slits is aligned with the service-user-cable slot. The preceding subject matter of this paragraph characterizes example 13 of the present disclosure, wherein example 13 also includes the subject matter according to example 12, above.

The base further comprises a gasket retainer in the interior cavity of the base. The gasket retainer compresses the gasket in a horizontal direction, parallel to the first side of the mounting plate, to prevent movement of the gasket in the horizontal direction relative to the base. The gasket retainer comprises overhang features in engagement with the gasket to prevent movement of the gasket in a vertical direction, perpendicular to the first side of the mounting plate, relative to the base. The preceding subject matter of this paragraph characterizes example 14 of the present disclosure, wherein example 14 also includes the subject matter according to any one of examples 12-13, above.

The tray further comprises a second axle, coupled to and protruding from the first side of the mounting plate, and a spool that is rotatably coupled to the second axle such that the spool is rotatable relative to the mounting plate. The preceding subject matter of this paragraph characterizes example 15 of the present disclosure, wherein example 15 also includes the subject matter according to any one of examples 1-14, above.

The spool comprises a first end plate, a second end plate, and a hub, coupling together and spanning between the first end plate and the second end plate. The first end plate and the second end plate are releasably attached to the hub. The preceding subject matter of this paragraph characterizes example 16 of the present disclosure, wherein example 16 also includes the subject matter according to example 15, above.

The hub comprises resilient prongs. The first end plate comprises first-plate slots. The second end plate comprises second-plate slots. The resilient prongs are insertable into and engageable with corresponding ones of the first-plate slots and the second-plate slots to releasably attach the first end plate and the second end plate to the hub. The preceding subject matter of this paragraph characterizes example 17 of the present disclosure, wherein example 17 also includes the subject matter according to example 16, above.

The cable demarcation enclosure further comprises an optical-cable splice assembly coupled to the first side of the mounting plate and located within the interior cavity of the base. The preceding subject matter of this paragraph characterizes example 18 of the present disclosure, wherein example 18 also includes the subject matter according to any one of examples 1-17, above.

Also disclosed herein is a cable demarcation enclosure. The cable demarcation enclosure comprises a base, comprising an interior cavity a service-provider-cable slot and a service-user-cable slot formed in the base. The cable demarcation enclosure also comprises a cover, selectively enclosing the base. The cable demarcation enclosure further comprises a tray, removably attachable to the base, within the interior cavity of the base. The tray comprises a mounting plate, having a first side and a second side that is opposite the first side, an outer ring coupled to and protruding from the second side of the mounting plate, a first axle coupled to and protruding from the second side of the mounting plate at a center of the outer ring, a second axle coupled to and protruding from the first side of the mounting plate, and a spool rotatably coupled to the second axle such that the spool is rotatable relative to the mounting plate. The preceding subject matter of this paragraph characterizes example 19 of the present disclosure.

The cable demarcation system further comprises a cable winder comprising a second spool. The cable winder is rotatably coupleable to the first axle. The preceding subject matter of this paragraph characterizes example 20 of the present disclosure, wherein example 20 also includes the subject matter according to example 19, above.

Further disclosed herein is a method of electrically connecting a provider cable and a user cable at a demarcation point. The method comprises securing an end portion of the provider cable in a cable-retention channel of a spool of a cable winder. The method also comprises rotating the cable winder about an axle coupled to and protruding from a second side of a mounting plate of a tray, such that the provider cable is wound about the spool of the cable winder. The method further comprises after the provider cable is wound about the spool of the cable winder and the provider cable is in tension about the spool, releasing the cable winder to uncoil the provider cable from the spool and to urge the provider cable against an outer ring fixed to the second side of the mounting plate of the tray. The method additionally comprises after the provider cable is urged against the outer ring, releasing the end portion of the provider cable from the cable-retention channel and removing the cable winder from the axle. The method also comprises after the cable winder is removed from the axle, inserting the tray, with the provider cable urged against the outer ring, into the interior cavity of a base. The method further comprises connecting the end portion of the provider cable to the user cable at a location within the interior cavity and on a first side of the mounting plate that is opposite the second side. The method additionally comprises enclosing the base with a cover. The preceding subject matter of this paragraph characterizes example 21 of the present disclosure.

The described features, structures, advantages, and/or characteristics of the subject matter of the present disclosure may be combined in any suitable manner in one or more examples and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example or implementation. In other instances, additional features and advantages may be recognized in certain examples and/or implementations that may not be present in all examples or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended numbered paragraphs, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings, which are not necessarily drawn to scale, depict only certain examples of the subject matter and are not therefore to be considered to be limiting of its scope, the subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1A:
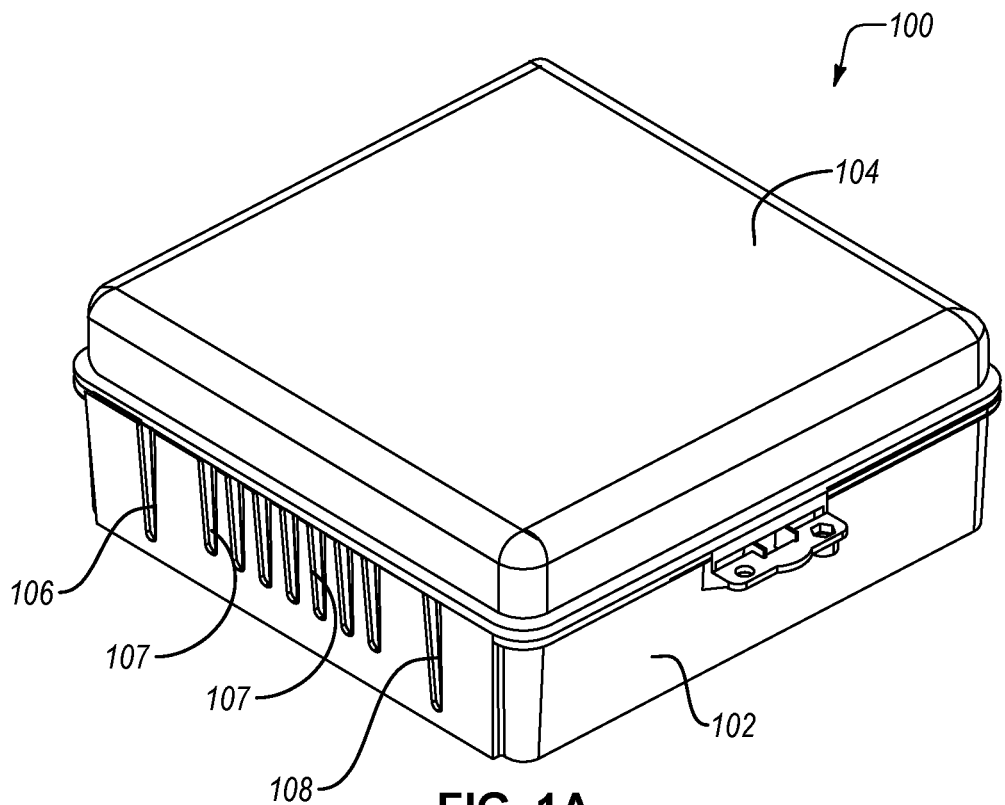
FIG. 1A is a schematic, perspective view of a cable demarcation enclosure, according to one or more examples of the present disclosure.
Figure 1B:
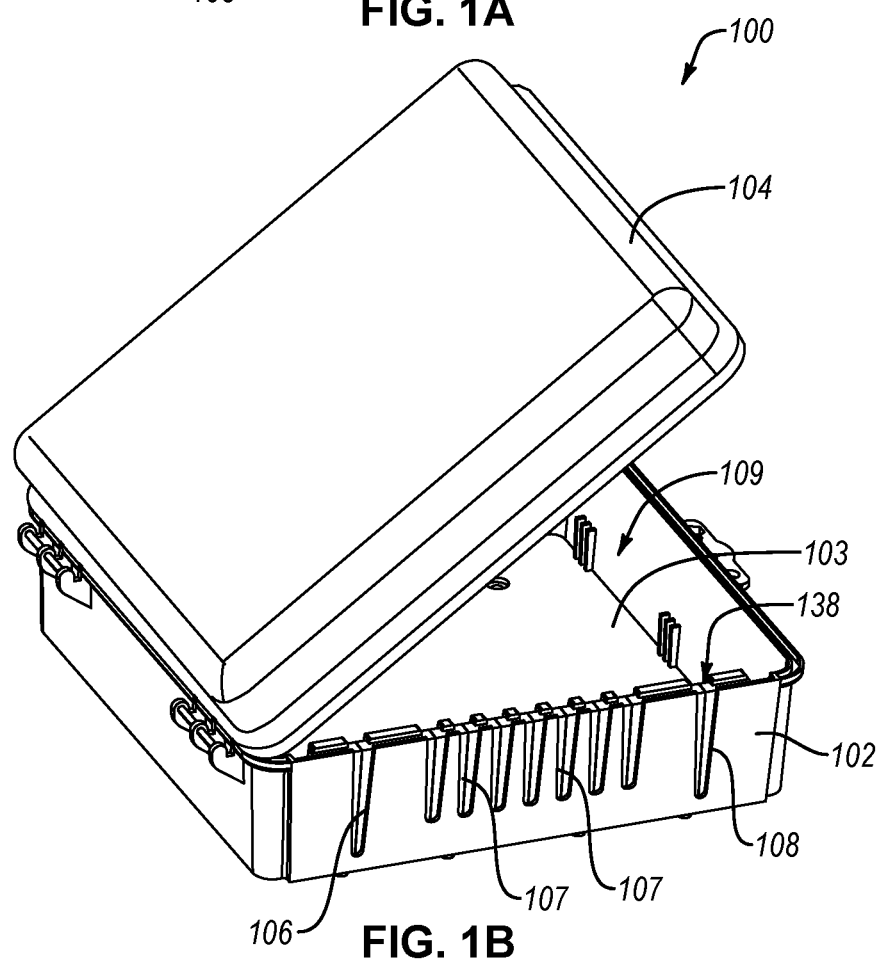
FIG. 1B is a schematic, perspective view of the cable demarcation enclosure of FIG. 1A, shown with a cover in an open position, according to one or more examples of the present disclosure.
Figure 1C:
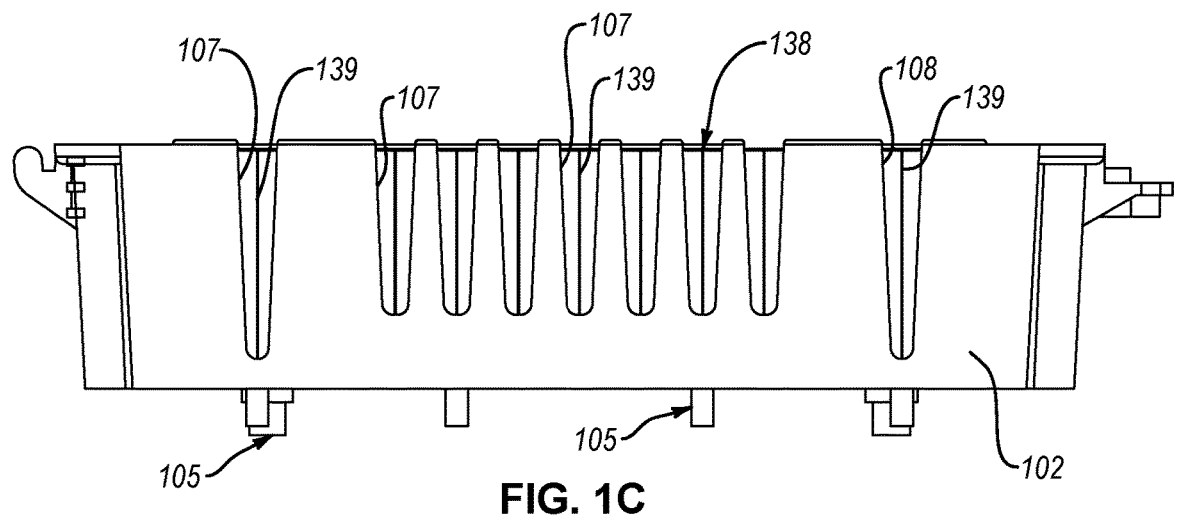
FIG. 1C is a schematic, side elevation view of the cable demarcation enclosure of FIG. 1A, shown with a cover removed, according to one or more examples of the present disclosure.
Figure 1D:
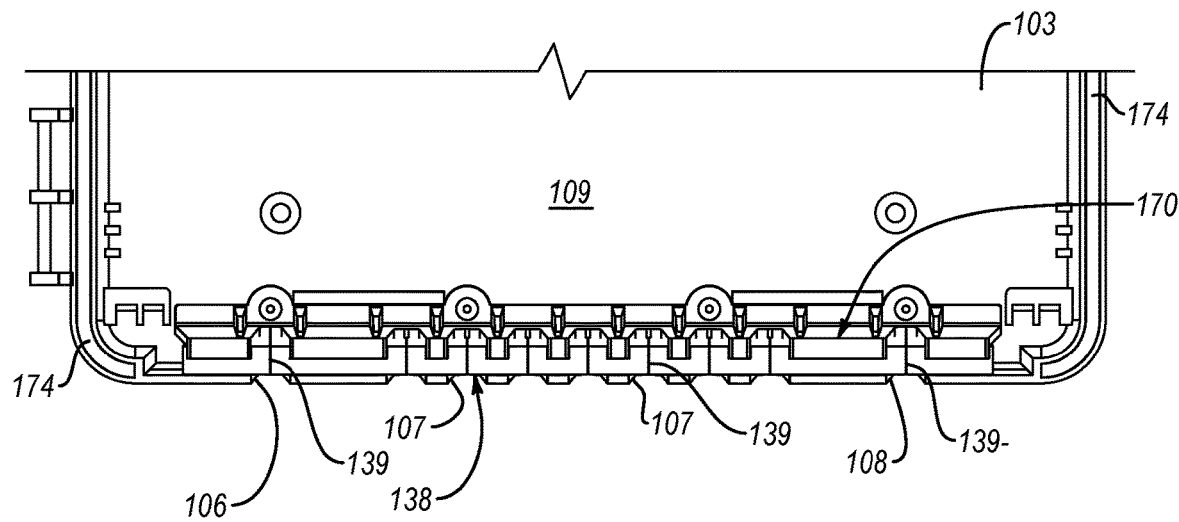
FIG. 1D is a schematic, top plan view of a side portion of the cable demarcation enclosure of FIG. 1A, shown with a cover removed, according to one or more examples of the present disclosure.

Referring to FIGS. 1A and 1B, one example of a cable demarcation enclosure 100 is shown. The cable demarcation enclosure 100 can be part of a cable demarcation system that comprises one or more cables housed by the cable demarcation enclosure 100. The cable demarcation enclosure 100 ("enclosure") is configured to receive a provider cable (e.g., fiber) from a service provider, facilitate a communicative coupling between the provider cable from the service provider and one or more user cables from a service user, and protect the components that facilitate the communicative coupling between the provider cable and the one or more user cables. The enclosure 100 includes a base 102 and a cover 104 that encloses the base 102. The cover 104, in certain examples, is movably (e.g., swivelably, hingedly, slidably, etc.) coupled to the base 102 such that the cover 104 can be moved relative to the base 102 to enable access to an interior cavity 109 (see, e.g., FIG. 3) of the base 102. Otherwise, when the cover 104 encloses the base 102, access to the interior cavity 109 of the base 102 is prevented. When closed, the cover 104 is sealed against the base 102. For example, as shown in FIG. 1D, the base 102 includes a perimeter gasket 174 that is coupled to and extends about a perimeter of the base 102. The perimeter gasket 174 forms a sealed engagement with the cover 104 when the cover is closed. In alternative examples, the perimeter gasket 174 is coupled to and extends about the cover 104. The base 102 includes a back panel 103 that is opposite the cover 104, when the cover 104 encloses the base 102 (see, e.g., FIG. 1A). Accordingly, the base 102 has an open end, covered by the cover 104 when the cover 104 is closed, and a closed end, defined by the back panel 103. As shown in FIG. 1C, in some examples, the back panel 103 includes external mounting features 105 (e.g., bosses) extending from the back panel 103. The external mounting features 105 help mount the enclosure 100 to a base object, such as a wall of a customer's home or business.

The base 102, in some examples, includes exterior slots, such as a service-provider-cable slot 106, a service-user-cable slot 108, and supplemental-cable slots 107. The slots are open ended where an open end of the slots are coincident with the opening of the interior cavity that is closed or covered by the cover 104. When the cover 104 is closed, the cover 104 closes or covers the open end of the slots. The service-provider-cable slot 106 enables a provider cable 156 to enter the base 102 and the service-user-cable slot 108 enables a user cable 172 to exit the base 102. The supplemental-cable slots 107 in the base 102 can be used to enable other cables and wires to enter and/or exit the base 102. According to certain examples, the enclosure 100 further includes a gasket 138 that is positioned within the base 102 adjacent the exterior slots to seal or help prevent moisture and debris from entering the base 102 (see, e.g., FIGS. 1B-1D and 3). The gasket 138 is made of a compliant material, such as rubber or foam, and includes slits 139 corresponding the exterior slots formed in the base 102. More specifically, each one of the slits 139 is located on the gasket 138 to align with a corresponding one of the exterior slots formed in the base 102. When pressed into a slit 139 and positioned within an exterior slot, the slit 139 conforms to and forms a seal against the cable. The exterior slots include an open end, which allows cables to be easily moved into and removed from the exterior slots (e.g., when the cover 104 is open) without requiring threading of the cable through the exterior slots.

To help retain the gasket 138 relative to the exterior slots, in some examples, the enclosure 100 further includes a gasket retainer 170 (see, e.g., FIG. 1D). The gasket retainer 170 is coupled to the back panel 103 (e.g., via fasteners, bonding, or co-molding) and is spaced apart from the side wall of the base 102 that defines the exterior slots. The gasket 138 is located within the space defined between the gasket retainer 170 and the side wall. Moreover, the gasket retainer 170 is spaced relative to the side wall, to apply a horizontal compression force against the gasket 138 to constrain horizontal movement (e.g., parallel to the top side 114 of the mounting plate 112) of the gasket 138 in the space. The gasket retainer 170 includes tabs that overhang the space defined between the gasket retainer 170 and the side wall. The tabs help to constrain vertical movement (e.g. perpendicular to the top side 114 of the mounting plate 112) of the gasket 128. Accordingly, the gasket retainer 170 enables horizontal and vertical retention of the gasket 138 in the space defined between the gasket retainer 170 and the side wall of the base 102.

Figure 2:
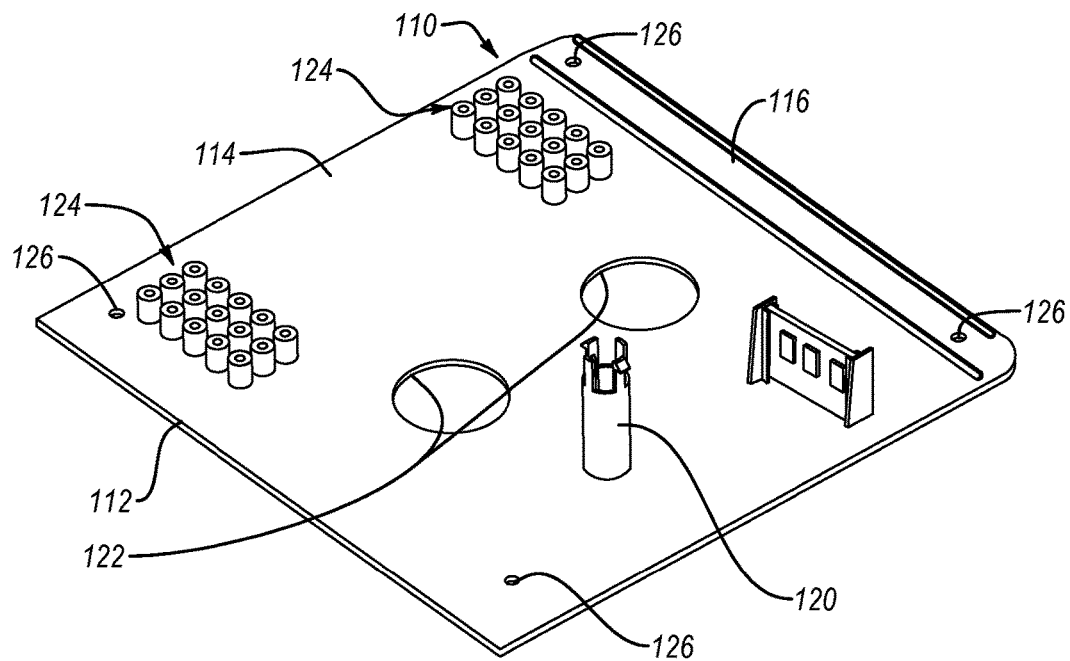
FIG. 2 is a schematic, perspective view of a tray of a cable demarcation enclosure, according to one or more examples of the present disclosure.

As shown in FIG. 2, the enclosure 100 further includes a tray 110 that is selectively attachable to and detachable from the base 102. The tray 110 includes a mounting plate 112 that has a top side 114 (e.g., first side) and a bottom side 136 (e.g., second side) (see, e.g., FIG. 6). When attached to the base 102, and the cover 104 is closed, the mounting plate 112 of the tray 110 is positioned within the interior cavity 109 of the base 102 such that the top side 114 faces the cover 104 and the bottom side 136 faces away from the cover 104. More specifically, the bottom side 136 of the mounting plate 112 faces the back panel 103 of the base 102 that is opposite the cover 104 when the cover 104 encloses the base 102 (see, e.g., FIG. 3). The tray 110 is spaced apart from the back panel 103 and from the opening of the base 102, such that the tray 110 divides the interior cavity 109 into two portions (e.g., an upper portion and a lower portion).

Figure 12:
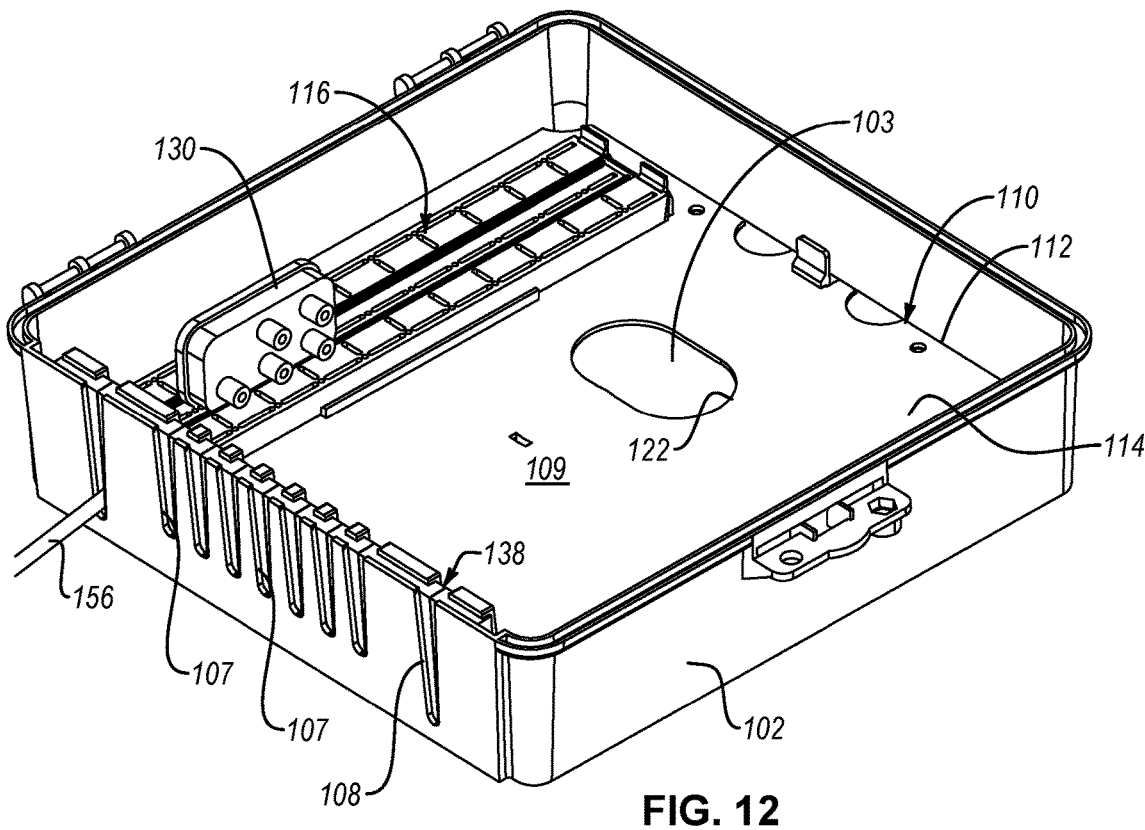
FIG. 12 is a schematic, perspective view of a cable demarcation enclosure, shown without a cover, according to one or more examples of the present disclosure.
Figure 13:
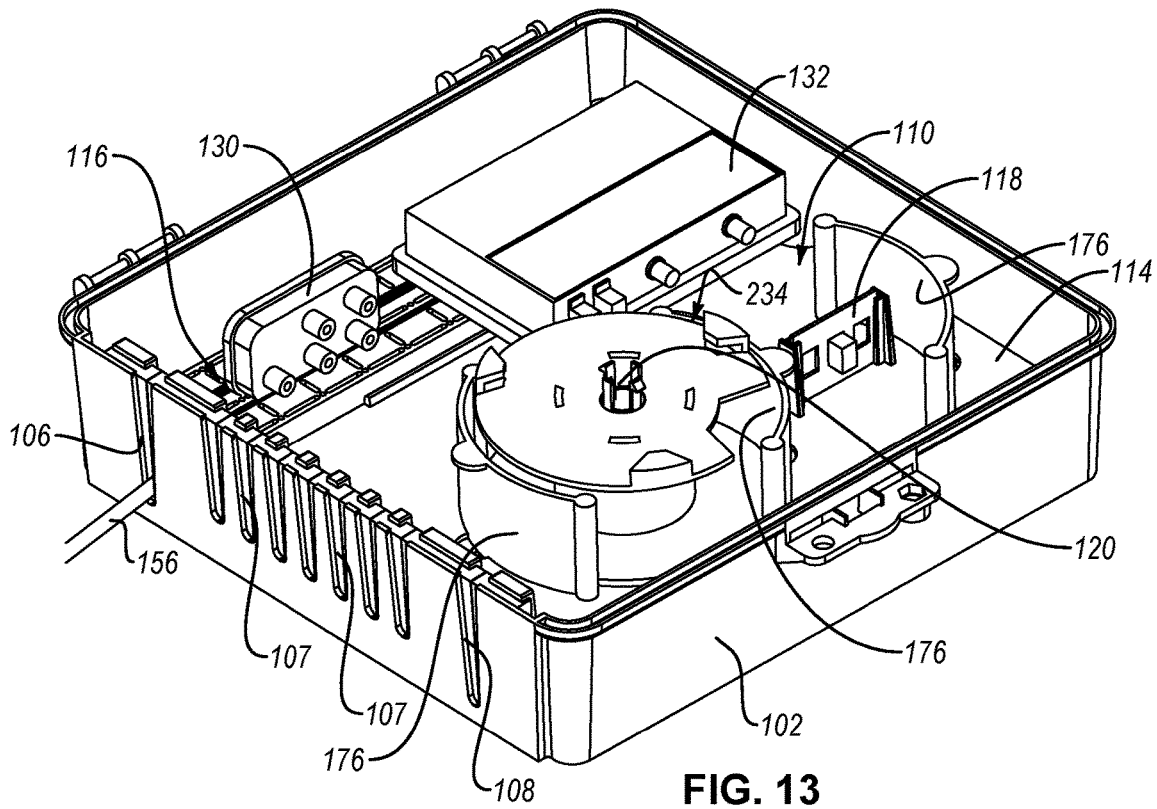
FIG. 13 is a schematic, perspective view of a cable demarcation enclosure, shown without a cover, according to one or more examples of the present disclosure.

The tray 110 includes various components coupled to, or formed in, the top side 114 of the mounting plate 112 that help facilitate electrical coupling between cables within the enclosure 102. For example, the tray 110 includes mounting bosses 124 that promote the coupling of electronic devices, such as an optical-to-RF converter 132 (see, e.g., FIG. 4) or other equipment, to the top side 114. The tray 110, in some examples, also includes quick-mount rails 116 that promote ease in attaching other electronic devices, such as an RF signal splitter 130 (see, e.g., FIG. 4) or other equipment. As shown in FIGS. 12 and 13, the tray 110 includes a quick-mount rail 116 to which different types of electrical equipment, such as the optical-to-RF converter 132 and the RF signal splitter 130, can be mounted.

Additionally, in certain examples, the tray 110 includes an optical-cable splice assembly 118 coupled (e.g., fixed or attached) to the top side 114 of the mounting plate 112 and locatable within the interior cavity 109 of the base 102. The optical-cable splice assembly 118 is configured to splice together two fiber optic cables. In some examples, the optical-cable splice assembly 118 includes a splicing device capable of fusion splicing together the optical fibers of two fiber optic cables. The optical-cable splice assembly 118 can include two spaced-apart upright supports, fixed to the top side 114, and a splicing device that is slidably engaged with the upright supports to releasably retain the splicing device between the upright supports.

Figure 4:
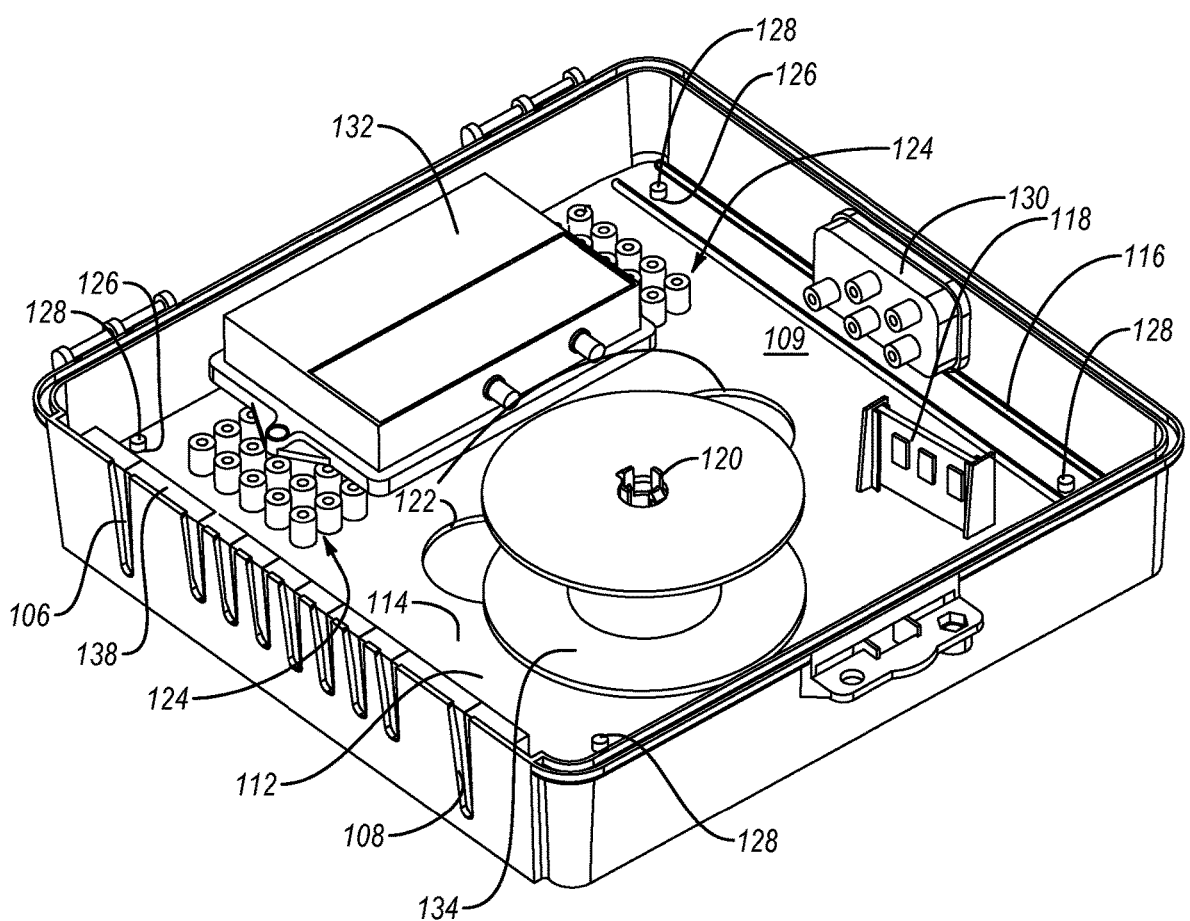
FIG. 4 is a schematic, perspective view of a cable demarcation enclosure, shown without a cover, according to one or more examples of the present disclosure.

In further examples, as shown, the tray 110 includes a secondary-cable-spool axle 120 or spindle that extends from the top side 114. As shown in FIG. 4, the secondary-cable-spool axle 120 is configured to receive and removably retain a secondary-cable spool, such that the secondary-cable spool 134, which retains a spooled secondary cable (not shown) and is rotatable about the secondary-cable-spool axle 120. The secondary cable can be any of various types of cables (e.g., ethernet passive optical network (EPON) cables) for facilitating electrical signal communications between a provider cable 156 of a service provider and a user cable 172 of a service user (see, e.g., FIG. 7). However, in certain examples, the secondary cable is the user cable 172, such that excess portions of the user cable 172 can be spooled around the secondary-cable spool 134.

Figure 14:
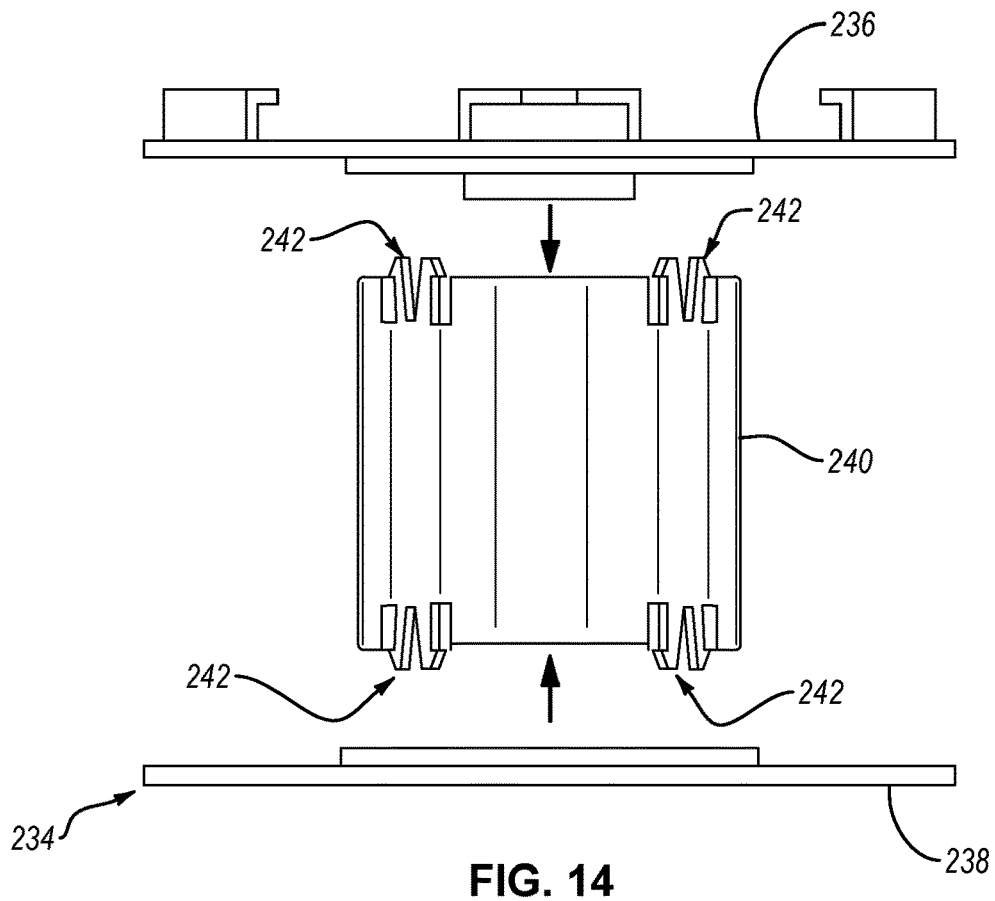
FIG. 14 is a schematic, exploded, side elevation view of a secondary-cable spool of a cable demarcation enclosure, according to one or more examples of the present disclosure.
Figure 15:
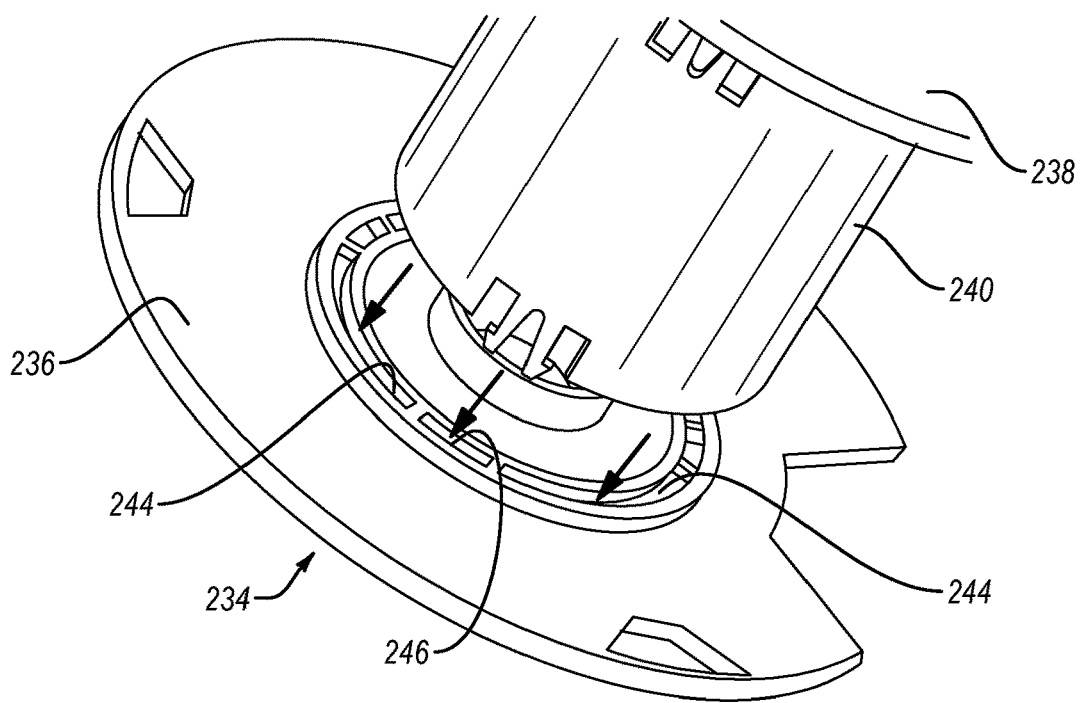
FIG. 15 is a schematic, perspective view of the secondary-cable spool of FIG. 14, according to one or more examples of the present disclosure.

Referring to FIGS. 13-15, in some examples, the enclosure 100 includes a secondary-cable spool 234 that promotes convenient and efficient storage and handling. The secondary-cable spool 234, like the secondary-cable spool 134, is configured to be retained on and rotate relative to the secondary-cable-spool axle 120. Moreover, the secondary-cable spool 234 includes a first end plate 236, a second end plate 238, and a hub 240 coupling together and spanning between the first end plate 236 and the second end plate 238. The first end plate 236 and the second end plate 238 are releasably attachable to and removable from the hub 240. In one example, the hub 240 includes plate engagement features 242 at opposite ends of the hub 240. Correspondingly, each one of the first end plate 236 and the second end plate 238 includes slots that receive corresponding ones of the plate engagement features 242 or corresponding portions of a sidewall of the hub 240.

In the illustrated examples, each one of the plate engagement features 242 includes two resilient prongs that deform to pass through a corresponding one of engagement-feature slots 246 formed in the first end plate 236 and the second end plate 238. The engagement-features slots 246 are open-ended or through-slots. After passing through the engagement-feature slot 246, the resilient prongs return to their original shape. Moreover, the resilient prongs include teeth such that after the resilient prongs return to their original shape, the teeth engage an opposite side of the first end plate 236 or the second end plate 238 to retain the first end plate 236 or the second end plate 238 to the hub 240. To decouple the first end plate 236 and the second end plate 238 from the hub 240, the resilient prongs of the plate engagement features 242 can be manually deformed to allow the resilient prongs to pass through and be removed from the engagement-feature slots 246. To help with stiffness, corresponding portions of the sidewall of the hub 240 can be inserted into corresponding ones of sidewall slots 244 of the first end plate 236 and the second end plate 238.

When the enclosure 100 is stored or transported, the secondary-cable spool 234 can be disassembled, which facilitates efficient (e.g., space-saving) packing of the components of the secondary-cable spool 234. Then, at a customer site, the secondary-cable spool 234 can be assembled and coupled to the secondary-cable-spool axle 120.

Referring again to FIG. 13, in some examples the tray 110 includes cable-retention walls 176 formed in or coupled to the top side 114 of the mounting plate 112. In the illustrated example, the tray 110 includes a pair of curved cable-retention walls 176 positioned about the secondary-cable spool 234, when mounted on the secondary-cable-spool axle 120. The cable-retention walls 176 help to prevent cable, wound on the secondary-cable spool 234, from unwinding. One of more cable-retention walls 176 can be positioned to help redirect cable through the interior cavity 109, in some examples.

Figure 3:
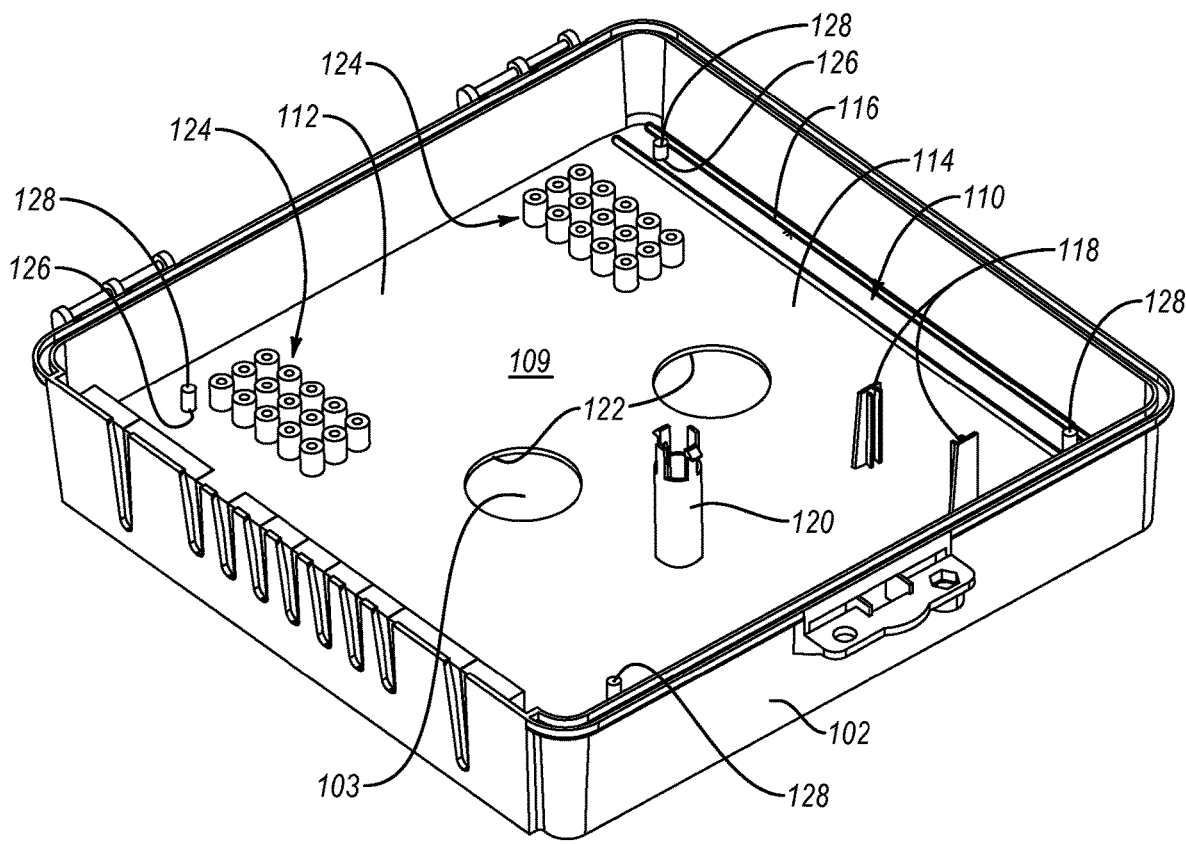
FIG. 3 is a schematic, perspective view of a cable demarcation enclosure, shown without a cover, according to one or more examples of the present disclosure.

The mounting plate 112 also includes various apertures. As shown in FIG. 2, the mounting plate 112 includes at least one access aperture 122 that promotes access from the bottom side 136 of the mounting plate 112 to the top side 114 of the mounting plate 112. For example, a portion of the provider cable 156 can be passed from the bottom side 136 to the top side 114 through an access aperture 122. In the illustrated example, the mounting plate 112 includes two access apertures 122, but could include only one or more than two access apertures. The mounting plate 112 also includes mounting apertures 126 that help facilitate selective attachment of the mounting plate 112 to the base 102. Referring to FIG. 3, the mounting apertures 126 are spaced apart from each other and located at different locations (e.g., separate corners) of the mounting plate 112. The base 102 includes pins 128 that are spaced apart from each other and located at different locations (e.g., separate corners) of the base 102, which correspond with the different locations of the mounting apertures 126. In other words, the pins 128 of the base 102 are positioned to correspond with the position of the mounting apertures 126 such that each one of the pins 128 is alignable with a respective one of the mounting apertures 126.

The pins 128 are configured to pass through respective ones of the mounting apertures 126, from the bottom side 136 of the mounting plate 112 to the top side 114 of the mounting plate 112, and to releasably engage the top side 114. The releasable engagement between the pins 128 and the top side 114 enable selective retention of the mounting plate 112, and thus the tray 110, to the base 102. In some examples, the pins 128 include flexible tabs biased outwardly to engage the top side 114 after passing through the mounting apertures 126. The tabs can be manually flexed inwardly, against the bias, to allow the pins 128 to pass from the mounting apertures 126 from the top side 114 to the bottom side 136, which enables the mounting plate 112, and thus the tray 110, to be removed from the base 102. Other configurations of the pins 128, which facilitate releasable engagement with the top side 114, such as any of various quick-release mechanisms, can be incorporated into the pins 128. Such a "snap-fit" configuration allows the tray 110 to be attachable to and removably from the base 102 without the need for separate fasteners.

Figure 5:
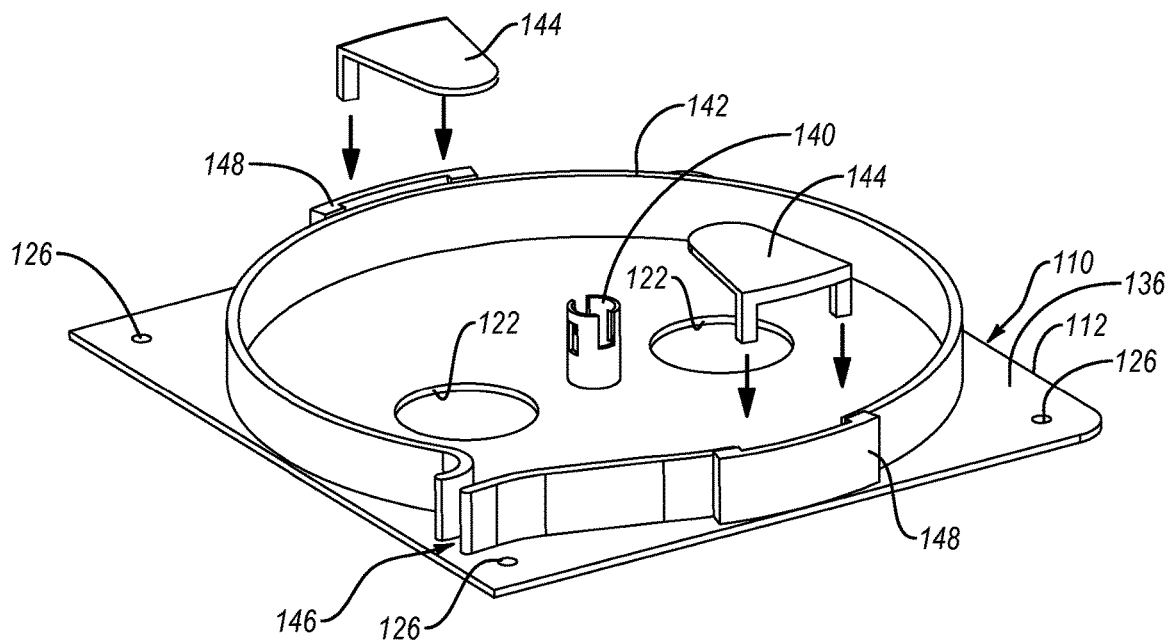
FIG. 5 is a schematic, perspective view of a tray of a cable demarcation enclosure, according to one or more examples of the present disclosure.
Figure 6:
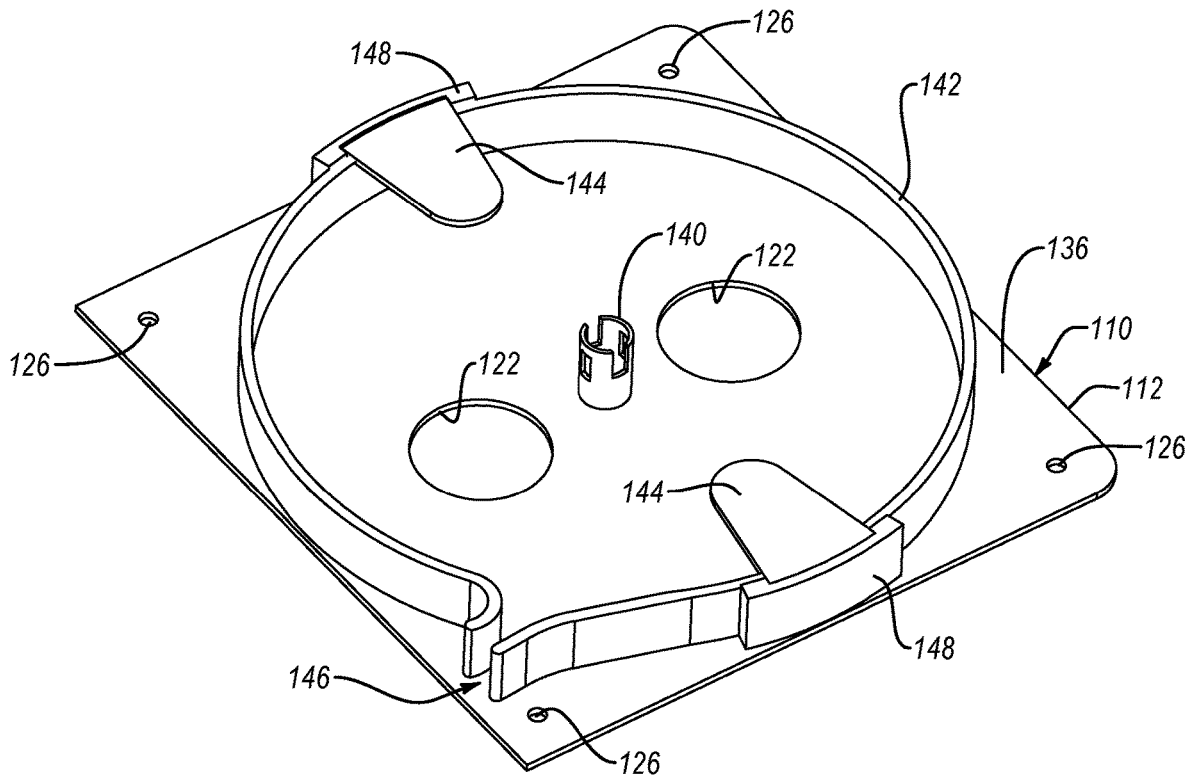
FIG. 6 is a schematic, perspective view of the tray of FIG. 5, according to one or more examples of the present disclosure.
Figure 7:
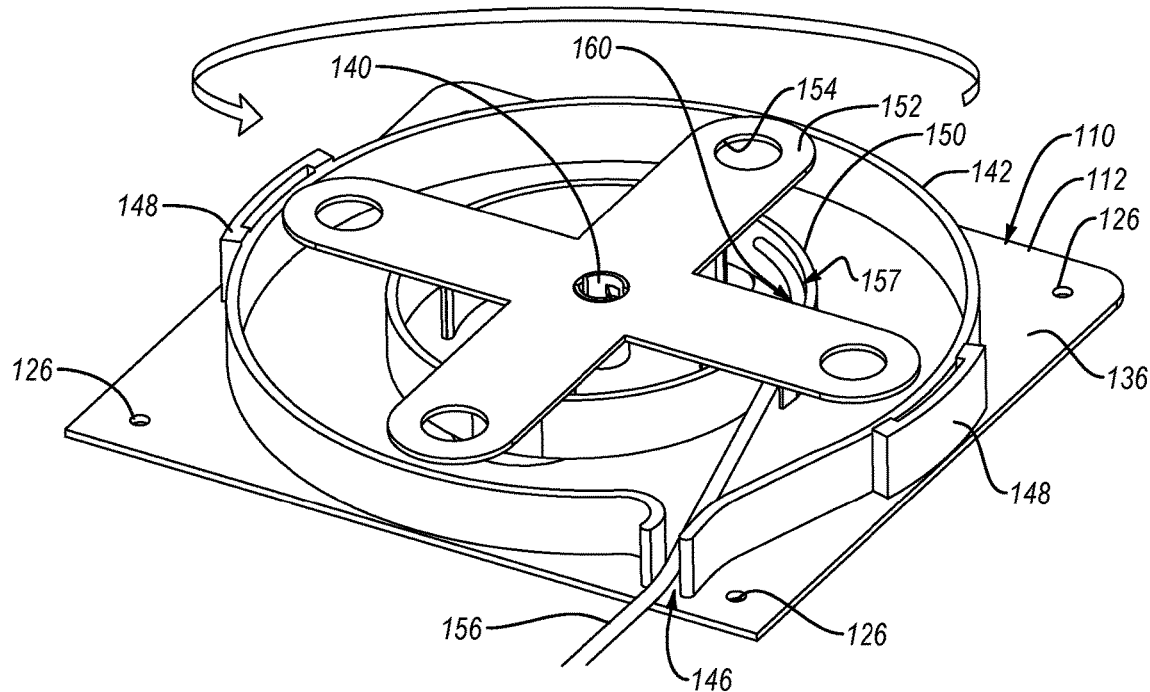
FIG. 7 is a schematic, perspective view of the tray of FIG. 5, according to one or more examples of the present disclosure.
Figure 8:
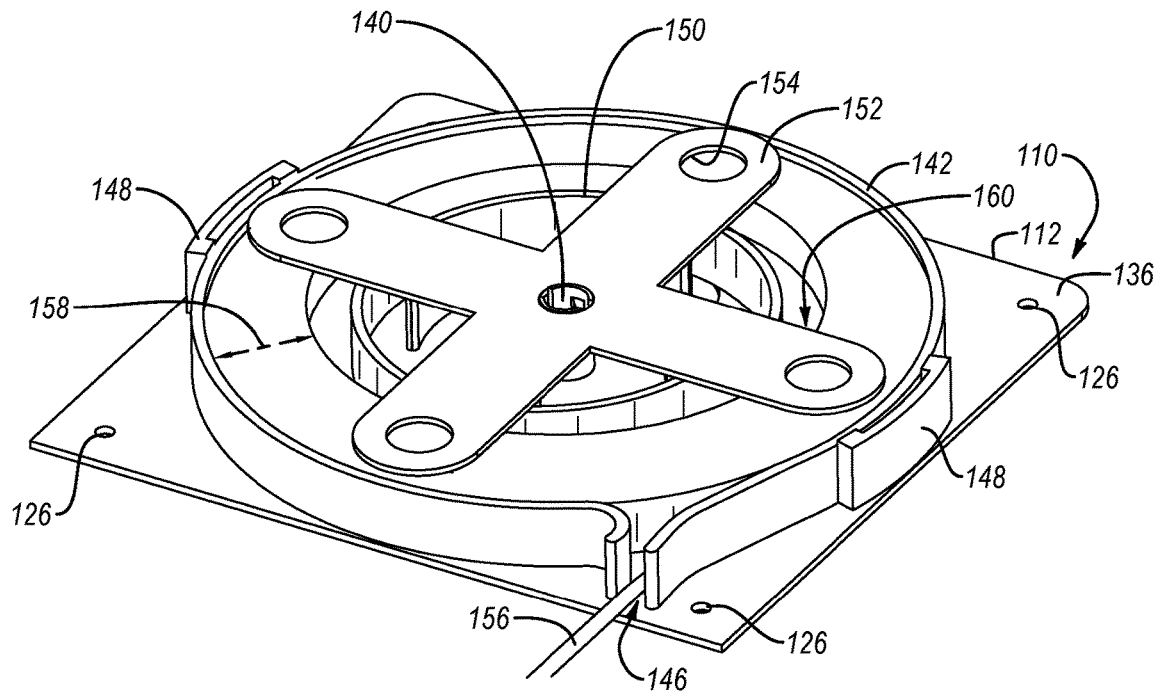
FIG. 8 is a schematic, perspective view of the tray of FIG. 5, according to one or more examples of the present disclosure.
Figure 9:
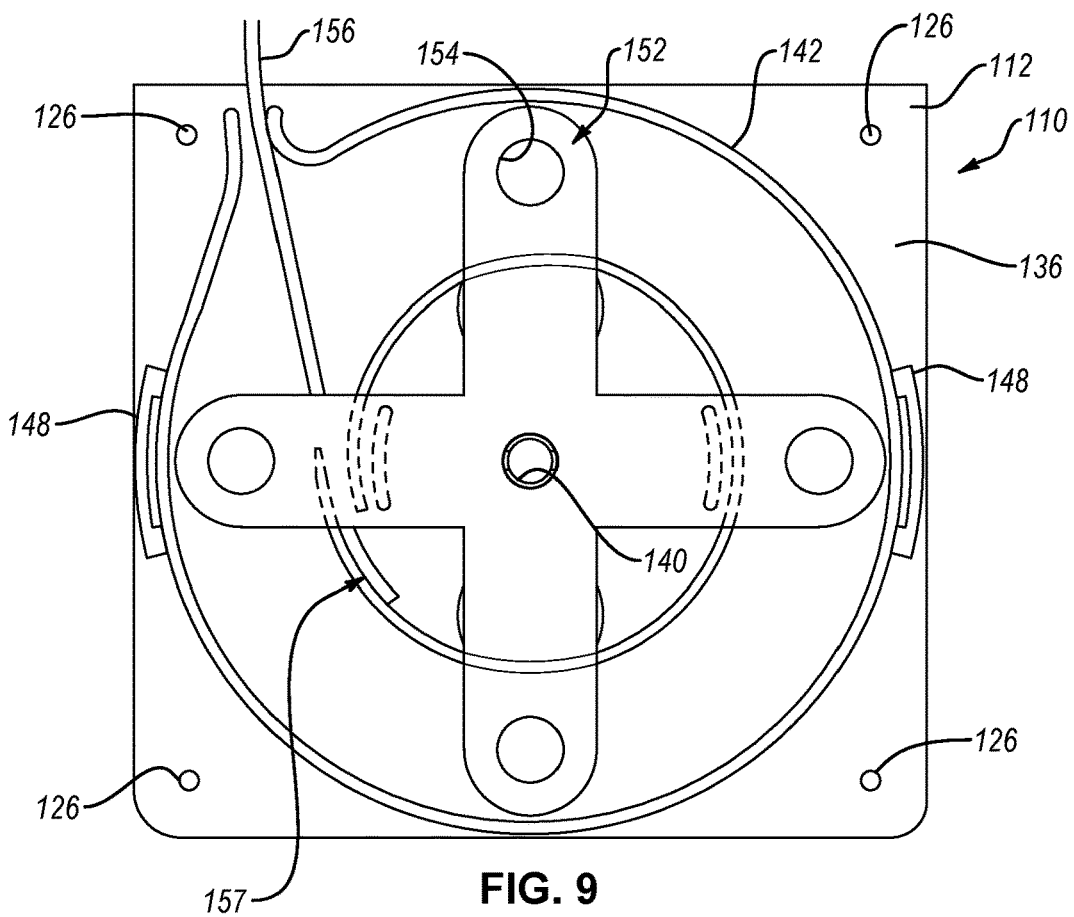
FIG. 9 is a schematic, top plan view of the tray of FIG. 5, according to one or more examples of the present disclosure.

Referring to FIGS. 5 and 6, the tray 110 includes an outer ring 142 coupled to and extending from the bottom side 136 of the mounting plate 112. The outer ring 142 includes a wall that has a generally circular shape and is circumferentially closed, except for a cable inlet 146 formed in the outer ring 142. The tray 110 further includes a provider-cable-spool axle 140 or spindle coupled to and extending from the bottom side 136 of the mounting plate 112. The provider-cable-spool axle 140 is located at a center of the outer ring 142. As shown in FIGS. 7-9, the provider-cable-spool axle 140 is configured to receive and removably retain a provider-cable spool 150, or inner ring, such that the provider-cable spool 150, which retains the provider cable 156 in a spooled arrangement, is rotatable about the provider-cable-spool axle 140. The provider cable 156 can be any of various types of cables, such as flat drop cable, coaxial cable, and the like. When the tray 110 is mounted to the base 102 within the interior cavity 109, the outer ring 142 and other components mounted to the bottom side 136 of the mounting plate 112 are located in the bottom portion of the interior cavity 109 and the electronic devices, the secondary-cable spool 134, and other components mounted to the top side 114 of the mounting plate 112 are located in the upper portion of the interior cavity 109.

The tray 110 also include overhead retainers 144 that extend parallel with, but offset from, the bottom side 136 and extend from the outer ring 142 radially inwardly toward the provider-cable-spool axle 140. In some examples, the overhead retainers 144 are positioned on opposite sides of the outer ring 142. Moreover, in certain examples, each one of the overhead retainers 144 extends radially inwardly a distance that is at least equal to a radial distance between the outer ring 142 and the provider-cable spool 150. The overhead retainers 144 are configured to retain the provider cable 156, when spooled about the provider-cable spool 150, on the bottom side 136 or to prevent the provider cable 156, when spooled about the provider-cable spool 150, from moving away from the bottom side 136 and disengaging the provider-cable spool 150. More specifically, the overhead retainers 144 are configured to keep the provider cable 156, when spooled about the provider-cable spool 150, within the space defined between the overhead retainers 144 and the bottom side 136.

Figure 16:
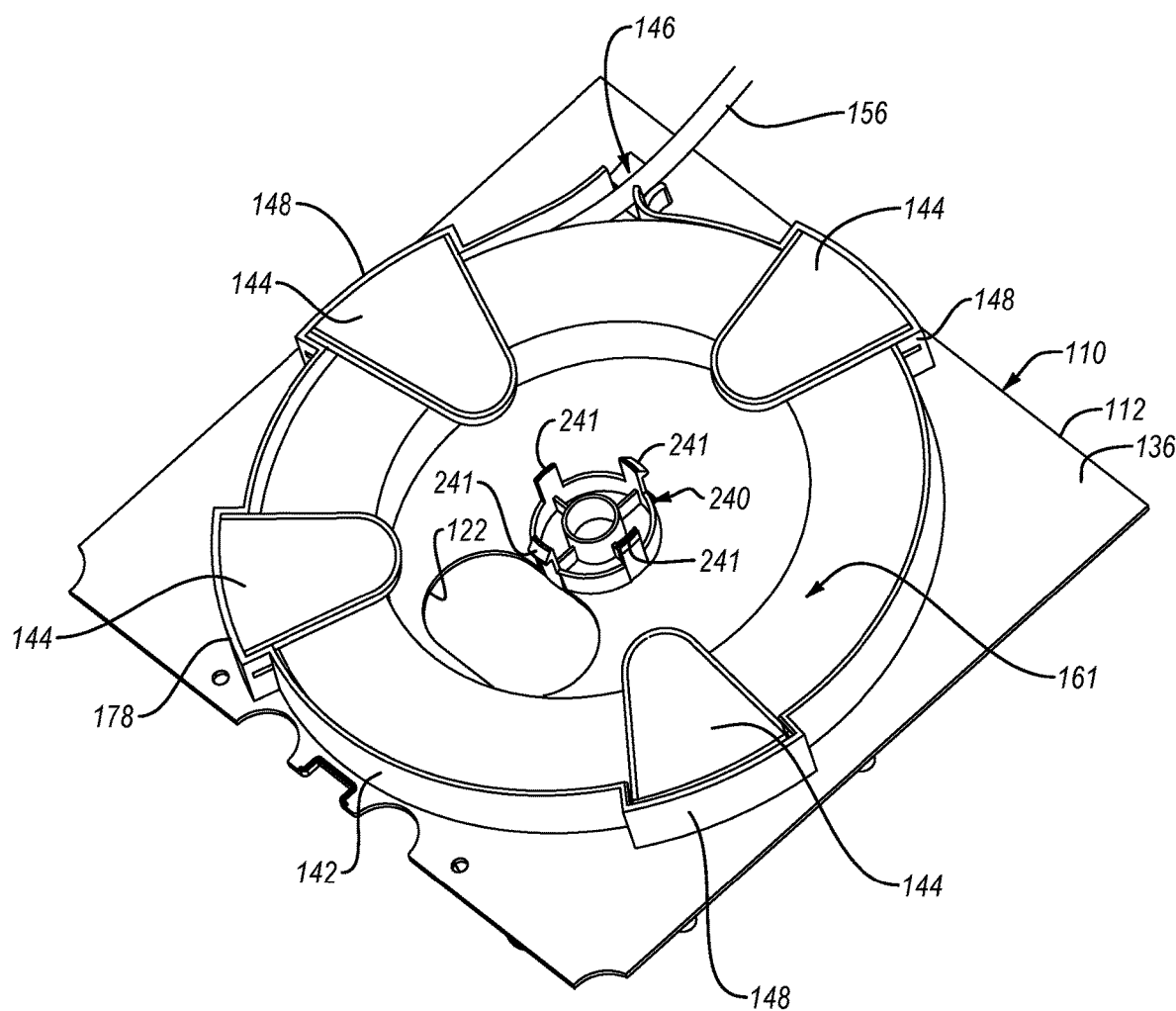
FIG. 16 is a schematic, perspective view of a tray of a cable demarcation enclosure, according to one or more examples of the present disclosure.
Figure 17:
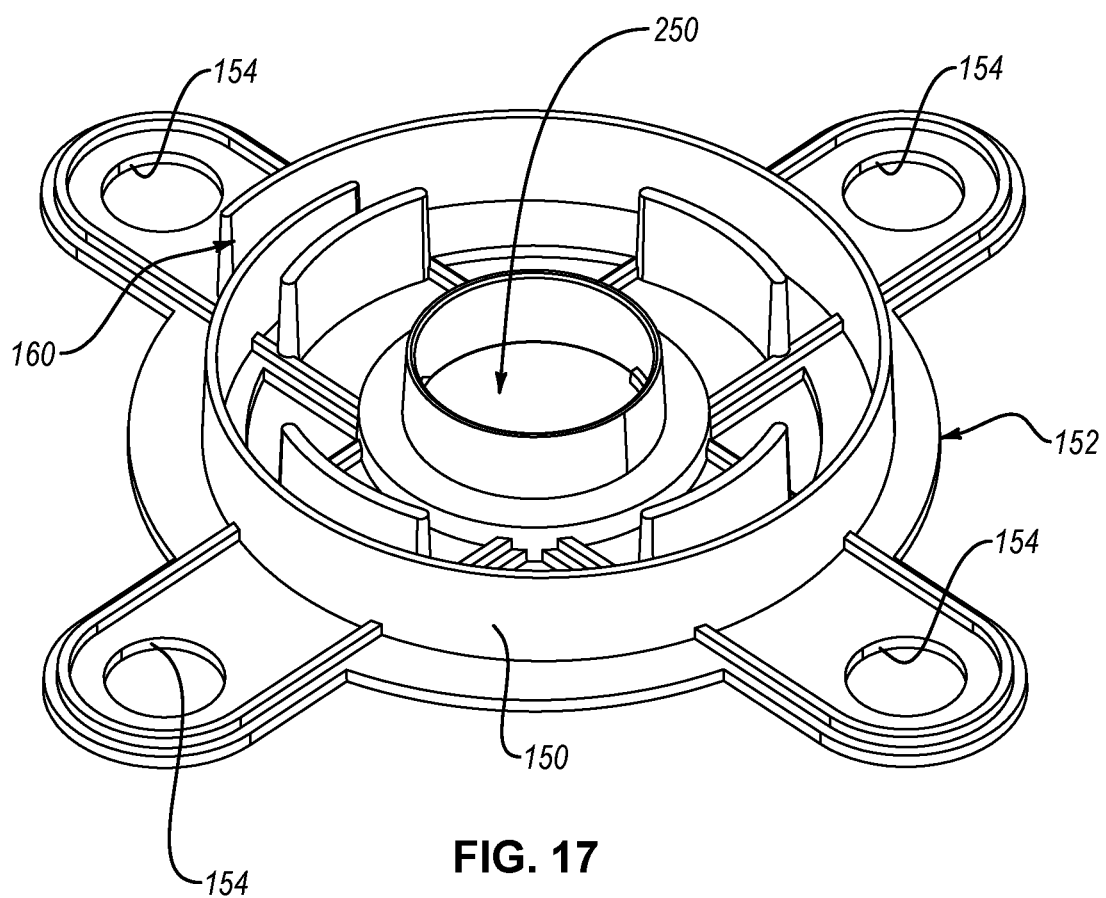
FIG. 17 is a schematic, perspective view of a cable winder of a cable demarcation enclosure, according to one or more examples of the present disclosure.

In some examples, the overhead retainers 144 are secured to the bottom side 136 by retention brackets 148 fixed to the bottom side 136. The overhead retainers 144 are removably secured to the retention brackets 148, such that the overhead retainers 144 can be selectively removed from the retention brackets 148. In some examples, the overhead retainers 144 can be removed to allow the cable winder 152 to be coupled to the provider-cable-spool axle 140 and then attached to help retain the provider cable 156 on the provider-cable-spool axle 140 while the provider cable 156 is being wound. Then the overhead retainers 144 can be removed to enable removal of the cable winder 152 after the provider cable 156 is retained by the outer ring 142, as described in more detail below. Although in some examples the tray 110 includes two overhead retainers 144, as shown in FIG. 6, in other examples, such as shown in FIG. 16, the tray 110 can include more than two overhead retainers 144, such as four overhead retainers 144.

The provider-cable spool 150, like the outer ring 142, is circumferentially closed except for a cable-retention channel 160 defined between overlapping portions of the provider-cable spool 150. For example, the provider-cable spool 150 is defined by a wall, which can be a circular wall or a spiraled wall, and the cable-retention channel 160 is defined between overlapping portions of the wall. The cable-retention channel 160 is gapped such that the provider cable 156 can be retained within the cable-retention channel 160 with an interference fit. Attached to the provider-cable spool 150 and co-rotatable with the provider-cable spool 150 is a cable winder 152. The cable winder 152 can be engaged by a user to rotate (e.g., spin) the provider-cable spool 150 about the provider-cable-spool axle 140, as indicated by rotational direction arrows in FIG. 7. Engagement with the cable winder 152 by a user can be enhanced with at least one user-finger hole 154 formed in the cable winder 152. The user-finger hole 154 can be sized to receive a portion of a finger as leverage to assist the user in gripping and rotating the cable winder 152. In certain examples, the cable winder 152 includes four angularly spaced apart arms that extend away from a center of the provider-cable spool 150 and four user-finger holes 154, where each one of the four user-finger holes 154 is positioned at a radially outward end portion of a corresponding one of the arms. In other examples, grip enhancing features, other than the user-finger holes 154, can be used.

Often, excess provider cable 156 is provided at a servicer user site, or the site at which the enclosure 100 is located. Fiber optic "flat drop" cables cannot be spliced if they are cut too short during installation. This is also a desirable approach for coax drop cable installations. Conventionally, the excess provider cable 156 is stripped back and removed or stored in a separate storage enclosure. However, utilizing the bottom surface 136 of the tray 110 to retain excess provider cable 156, while mounting the necessary electrical components for operation of the enclosure 100 to the top side 114, incorporates the storage of excess provider cable 156 into a single enclosure, which reduces an overall installation footprint. In one example, the provider cable 156 is stored at the bottom surface 136 of the tray 110 by fixing a portion of the provider cable 156 in the cable-retention channel 160 and rotating the provider-cable spool 150 using the cable winder 152. As the provider-cable spool 150 rotates, the provider cable 156 is wound against the provider-cable spool 150, as shown in FIG. 8, leaving a gap 158 between the provider cable 156 wound against the provider-cable spool 150 and the outer ring 142.

Figure 10:
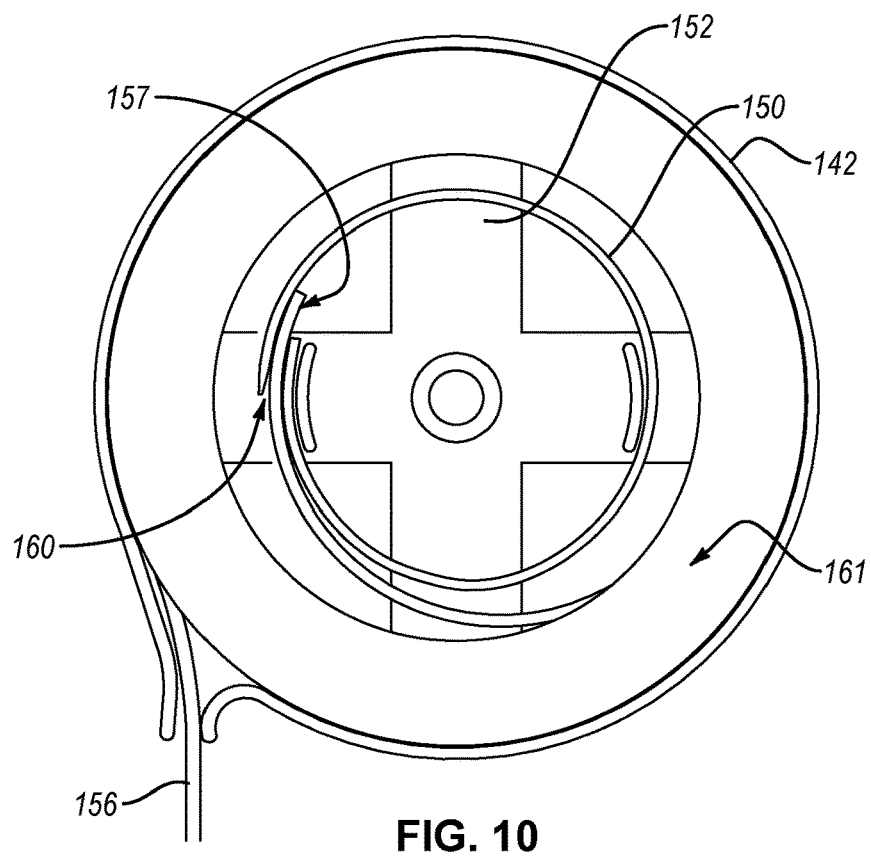
FIG. 10 is a schematic, top plan view of an outer ring and a provider-cable spool of the tray of FIG. 5, according to one or more examples of the present disclosure.
Figure 11:
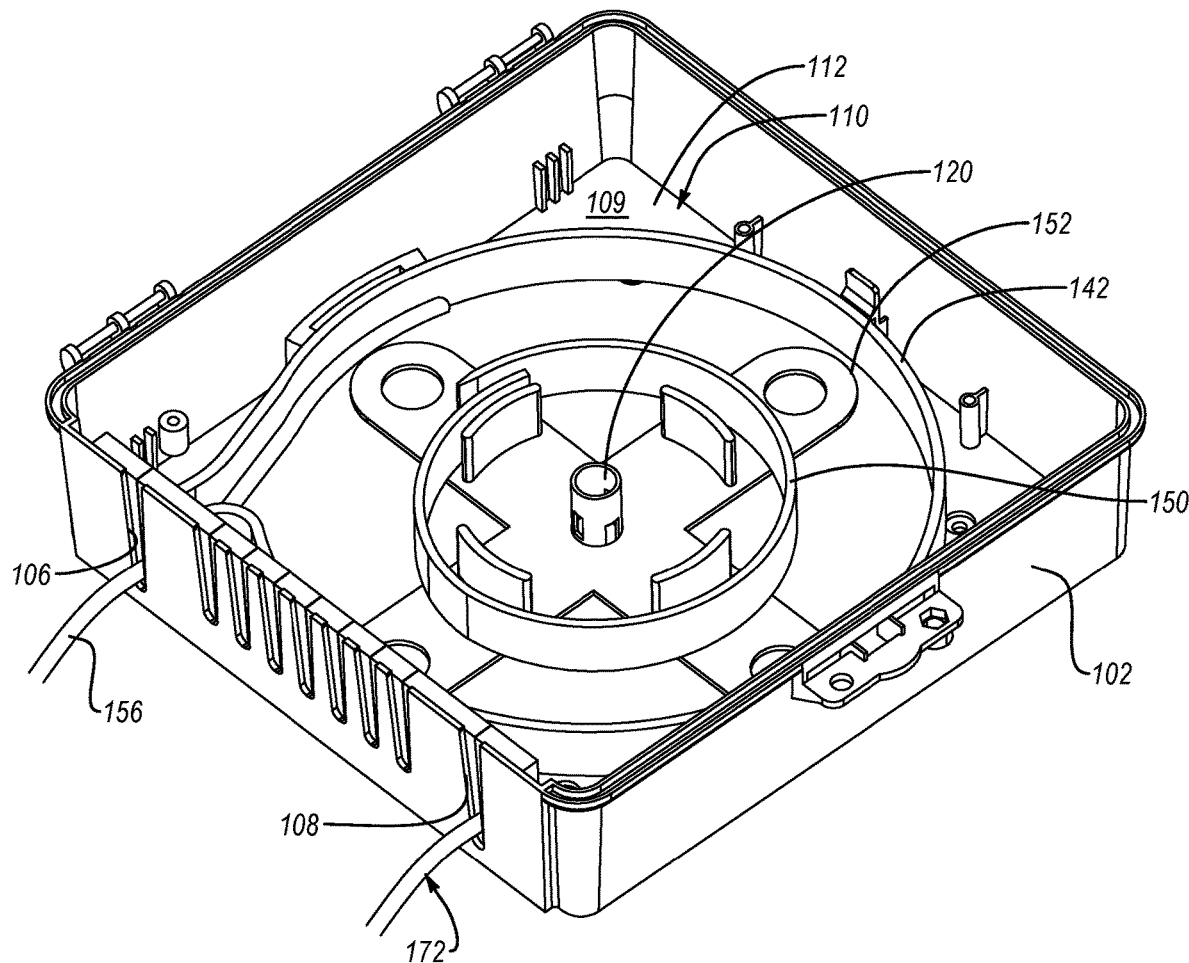
FIG. 11 is a schematic, perspective view of a cable demarcation enclosure, shown without a cover and having the tray of FIG. 5, according to one or more examples of the present disclosure.

Rotation of the provider-cable spool 150 continues until a desired amount of the provider cable 156 is wound about the provider-cable spool 150. Then, after the cable winder 152 is released by the user, the tension in the wound provider cable 156 causes the provider cable 156 to partially uncoil from the provider-cable spool 150, as the tension is released, fill the gap 158, and expand radially outwardly against the outer ring 142, as shown as 161 in FIGS. 10 and 16. With the provider cable 156 urged outwardly against the outer ring 142, due to stored tension in the provider cable 156 after being wound, the portion of the provider cable 156 fixed in the cable-retention channel 160 can be removed from the cable-retention channel 160. After being removed, this portion of the provider cable 156 can be passed through the access aperture 122 and electrically coupled with the electrical components on the top side 114 to complete an electrical connection between the provider cable 156 and a user cable 172 or secondary cable (see, e.g., FIG. 11). Accordingly, the provider cable 156 and the user cable 172 are electrically connected at a location within the interior cavity 109 of the base 102. Moreover, after the provider cable 156 is urged outwardly against the outer ring 142, the cable winder 152 can be removed from the provider-cable spool 150 and separated from the tray 110.

In one example, the provider cable 156 is wound on the provider-cable spool 150 when the tray 110 is detached from the base 102, such as shown in FIGS. 2 and 5-9. Then, once wound, the tray 110 can be removably attached to the base 102, as presented above. To help secure the tray 110 as the provider cable 156 is wound on the provider-cable spool 150, the secondary-cable-spool axle 120 can be used as a handle in some examples. Accordingly, in one example, a user can grasp the secondary-cable-spool axle 120 with one hand while rotating the provider-cable spool 150, relative to the mounting plate 112, with the other hand.

Figure 18:
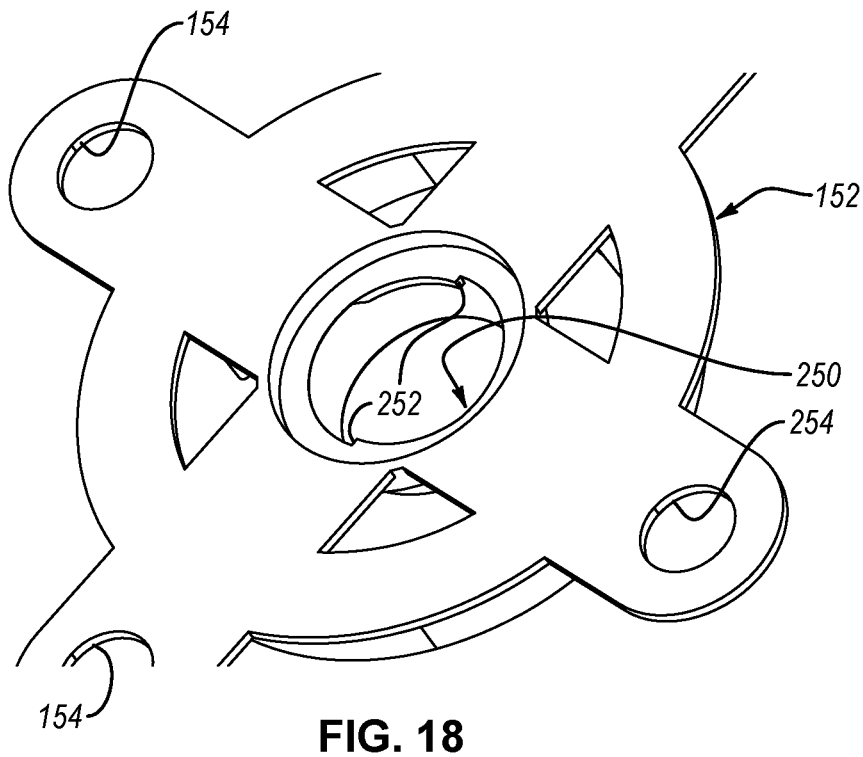
FIG. 18 is a schematic, perspective view of the cable winder of FIG. 18, according to one or more examples of the present disclosure.
Figure 19:
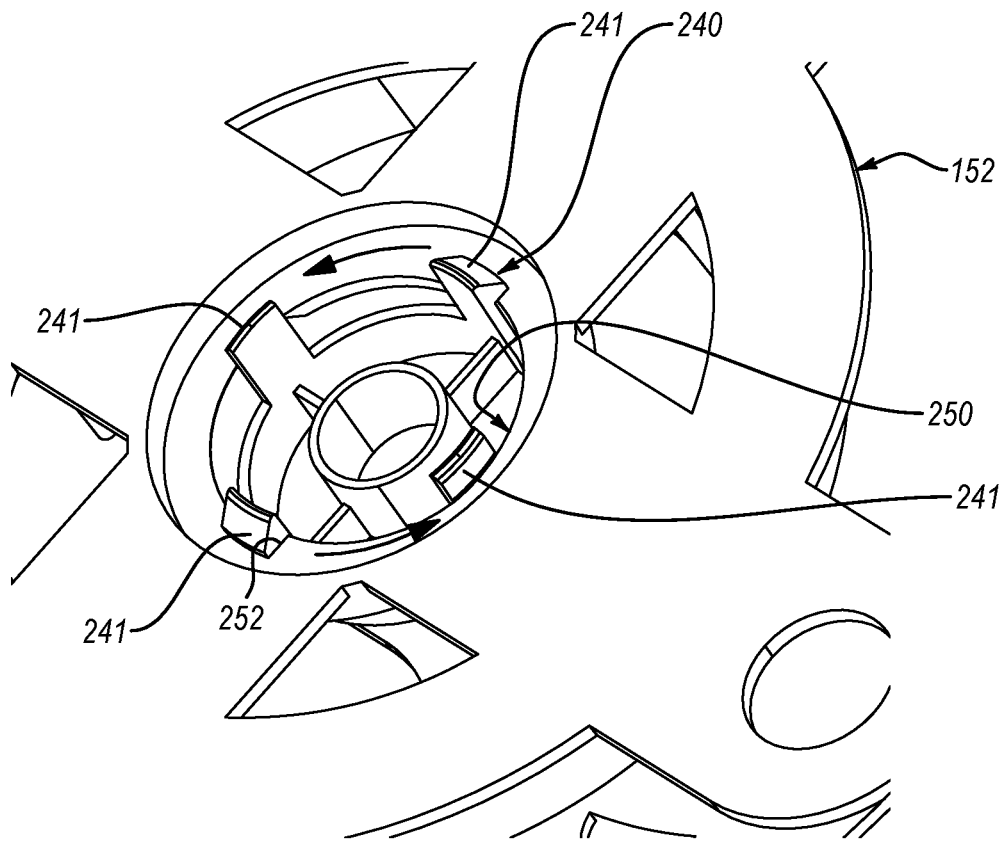
FIG. 19 is a schematic, perspective view of the cable winder of FIG. 18 and a provider-cable-spool axle, according to one or more examples of the present disclosure.

Referring to FIGS. 16-19, another example of a provider-cable-spool axle and a cable winder is shown. The provider-cable-spool axle 240 and the cable winder 152 of FIGS. 16-19 are similar to those shown in FIGS. 6, 9, and 10. However, the provider-cable-spool axle 240 and an axle receptacle 250 of the cable winder 152 of FIGS. 16-19 includes features that facilitate racheted engagement between the provider-cable spool axle 240 and the cable winder 152. Referring to FIG. 16, the provider-cable spool axle 240 includes a plurality of resilient prongs 241. The axle receptacle 250 is centered relative to the provider-cable spool 150. Referring to FIG. 19, the resilient prongs 241 are configured to flex inwardly toward each other, into a flexed state, as they contact the cable winder 152 and pass through the axle receptacle 250. Once toothed portions of the resilient prongs 241 pass entirely through the axle receptacle 250, the resilient prongs 241 unflex and move into an intermediate state between their original state and flexed state, which positions the toothed portions of the resilient prongs 241 radially outward beyond the axle receptacle 250. In this position, radially outward beyond the axle receptacle 250, the toothed portions of the resilient prongs 241 prevent the cable winder 152 from disengaging from the provider-cable-spool axle 240. Additionally, in the intermediate state, as shown in FIG. 19, the resilient prongs 241 are radially outwardly biased to apply a radially outward force against the wall of the axle receptacle 250. Accordingly, as the cable winder 152 rotates about the provider-cable-spool axle 240 in a winding direction, as shown in FIG. 19, the resilient prongs 241 are urged into contact with the wall of the axle receptacle 250.

Referring to FIG. 18, the wall of the axle receptacle 250 includes at least one notch 252. In FIG. 18, the wall of the axle receptacle 250 includes two notches 252 on opposite sides of the axle receptacle 250. The notches 252 face in an unwinding direction, which is opposite the winding direction shown in FIG. 19. As the cable winder 152 is rotated in the winding direction, relative to the provider-cable spool 150, to wind the provider cable 156 onto the provider-cable spool 150, the resilient prongs 242 slide along the wall of the axle receptacle 250 and slightly unflex, radially outwardly, as they clear a notch 252. Prior to clearing the next notch 252, because the shape of the axle receptacle 250 is slightly non-circular, the resilient prongs 242 are slightly radially inwardly flex to promote the radially outwardly directed bias of the resilient prongs 242. Then, after passing the next notch 252, the resilient prongs 242 again slightly unflex. Because the resilient prongs 242 remain biased against the wall of the axle receptacle 250, and because the notches 252 face the unwinding direction, if the cable winder 152 rotates in the unwinding direction, relative to the provider-cable spool 150, ultimately, one of the resilient prongs 242 will contact one of the notches 252 to prevent further rotation of the cable winder 152 in the unwinding direction, relative to the provider-cable spool 150.

Due to the stiffness of the provider cable 156, as the provider cable 156 is wound onto the provider-cable spool 150, the provider cable 156 can act as a torsional spring and urge rotation of the cable winder 152 in the unwinding direction. Accordingly, if during manually winding of the provider cable 156 about the provider-cable spool 150 the cable winder 152 is inadvertently released, the cable winder 152 will be prevented from excessive unwinding via engagement between the resilient prongs 242 and the notches 252. In this manner, the at least one notch 252 is configured to engage the resilient prongs 241 such that the cable winder 152 can freely or unobstructively rotate in the winding direction, but is obstructed from rotation in the unwinding direction.

In the examples illustrated above, various features of the cable demarcation enclosure 100 are shown and described as being coupled to or forming part of one or more other features of the cable demarcation enclosure 100. However, it is recognized that in other examples, the one or more of the features can be coupled to or form part of another one or more of the features of the cable demarcation enclosure 100 without affecting the functionality of the cable demarcation enclosure 100 or the one or more of the features of the cable demarcation enclosure 100. For example, the cable-retention walls 176 can be formed in or coupled to the cover 104, instead of the mounting plate 112. As another example, the secondary-cable-spool axle 120 can be formed in or coupled to the cover 104, instead of the mounting plate 112.

Additionally, in the above examples, some features have been described as being removably or releasably coupled or attached together. In other examples, however, these features can be non-removably or permanently coupled or attached together (e.g., bonded or co-formed together).

The illustrated examples described above and shown in the drawings are merely exemplary and do not encompass all examples of the present disclosure. It is recognized that the tray 110 can have any of various configurations each associated with one or more different uses or cable arrangements. For example, any number of trays (with similar features, different features, or combinations of features) can be used in a cable demarcation enclosure. In other words, based on the cable configuration used in a network communications system, any of various uniquely configured trays can be independently mounted inside the same base. This promotes the flexibility to use a single base to accommodate any one of variously configured trays. One practical benefit to this flexibility is the ability for a customer to purchase a single base/cover and then customize the enclosure by selecting a tray that is appropriate to the customer's needs.

If the customer's needs change, the existing tray can be easily modified or replaced with a new differently configured tray. This flexibility also helps with inventory by requiring less inventory (e.g., fewer bases and covers) at customer locations and with installation technicians.

Figure 20:
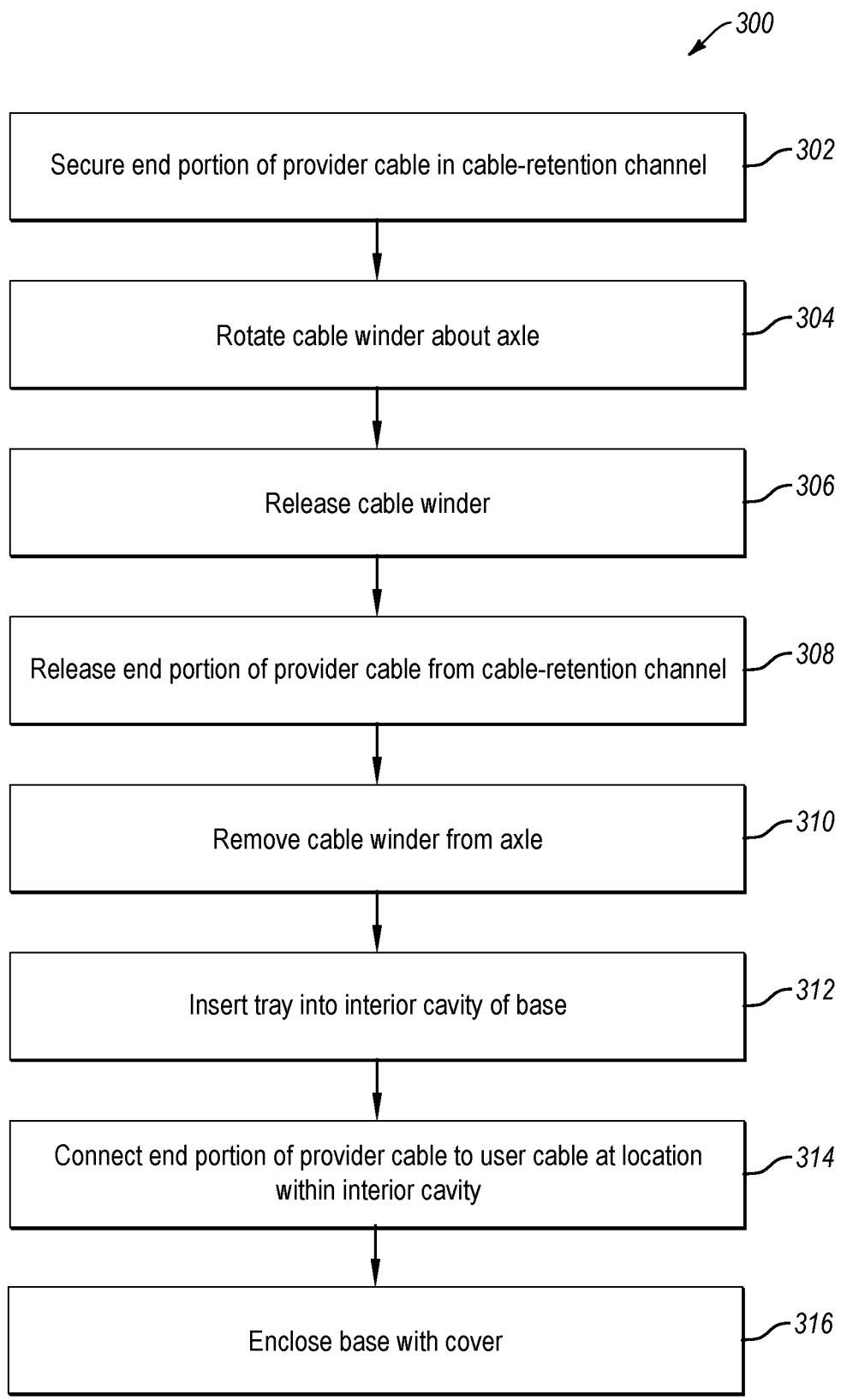
FIG. 20 is a flow chart of a method of electrically connecting a provider cable and a user cable at a demarcation point, according to one or more examples of the present disclosure.

Referring to FIG. 20, according to some examples, a method 300 of electrically connecting the provider cable 156 and the user cable 172 at a demarcation point is shown. The method 300 includes (block 302) securing an end portion of the provider cable 156 in the cable-retention channel 160 of the spool 150 of the cable winder 152. The method 300 also includes (block 304) rotating the cable winder 152 about the provider-cable-spool axle 140 of the tray 110, such that the provider cable 156 is wound about the spool 150 of the cable winder 152. The method 300 further includes (block 306) releasing the cable winder 152 to uncoil the provider cable 156 from the spool 150 and to urge the provider cable 156 against the outer ring 142, after the provider cable 156 is wound about the spool 150 and after the provider cable 156 is in tension about the spool 150. The method 300 additionally includes (block 308) releasing the end portion of the provider cable 156 from the cable-retention channel 160 and (block 310) removing the cable winder 152 from the provider-cable-spool axle 140, after the provider cable 156 is urged against the outer ring 142. The method 300 further includes (block 312) inserting the tray 110, with the provider cable 156 urged against the outer ring 142, into the interior cavity 109 of the base 102, after the cable winder 152 is removed from the provider-cable-spool axle 140. The method also includes (block 314) connecting the end portion of the provider cable 156 to the user cable 171, at a location within the interior cavity 109 and on the first side 114 of the mounting plate 112, and (block 316) enclosing the base 102 with the cover 104.

The above examples of the cable demarcation enclosure 100, system, and associated method 300 provide a flexible approach for facilitating any of various types of demarcation interfaces. More specifically, the cable demarcation enclosure 100, and the associated system and method of use, enables any of various types of cables and electronic devices to be quickly and efficiently electrically connected together in any of various arrangements. Accordingly, the particular types of cables and electronic devices shown and described above merely illustrate some examples of the types of cables and electronic devices that the cable demarcation enclosure 100 helps interconnect together. The cable demarcation enclosure 100 can help facilitate electrical connection between different cables and electronic devices and/or different arrangements of cables and electronic devices according to examples different than those particular examples disclosed above. Some additional examples, without limitation, are provided below. These examples illustrate how the cable demarcation enclosure 100, with any one of multiple tray configurations, can serve a wide variety of installation applications and provide the convenience of slack storage inside the enclosure. In other words, several tray configurations can address different network equipment possibilities, while providing the capability to store excess cable under the tray 110 and inside the cable demarcation enclosure 100.

A first example of a cable-to-cable demarcation facilitated by the cable demarcation enclosure 100 provides a termination between a drop cable (e.g., the provider cable 156) and a ground block or grounded splitter mounted to the tray 110, which helps to ground the sheath of the cable connected to the CATV network to the ground of the premises of the subscriber. Extra coax from the CATV network can be conveniently stored under the tray 110 before being terminates at the ground block. A component mounting block can be mounted to the tray 110 to serve as an adapter that provides mounting methods for conventional screws or quick-mount rails for products that are designed for mounting without fasteners. In some examples, the mounting block snaps into guides integral to the top side 114 (e.g., top surface) of the mounting plate 112 of the tray 110.

A second example of a fiber-to-fiber demarcation facilitated by the cable demarcation enclosure 100 provides a termination between an outdoor flat-drop optical cable (e.g., the provider cable 156) and an indoor optical cable (e.g., the user cable 172). Extra flat-drop optical cable is stored under the tray 110 and the connectorized end is brought up through an access aperture opening 122 in the mounting plate 112 of the tray 110 to the optical-cable splice assembly 118 on the top side 114 of the mounting plate 112. The spool (e.g., the secondary-cable spool 134) carrying the indoor optical cable snaps on to the secondary-cable-spool axle 120 on the top side 114 of the mounting plate 112 and its connectorized end mates with the fiber splice to complete the connection with the outdoor flat-drop optical cable.

A third example of a fiber-to-coax demarcation facilitated by the cable demarcation enclosure 100 provides a termination between an outdoor flat-drop optical cable (e.g., the provider cable 156) and a fiber-to-RF converter (i.e., fiber node) mounted to the top side 114 of the mounting plate 112. A coax cable (e.g., the user cable 172) connected to the fiber node carries the signal out of the enclosure and into the subscriber premises.

A fourth example of a fiber-to-fiber demarcation and coax transition facilitated by the cable demarcation enclosure 100 provides a termination between an outdoor flat-drop optical cable (e.g., the provider cable 156) and a fiber node. The fiber node, which can be mounted to the top side 114 of the mounting plate 112, has a fiber output as well as a fiber input. The fiber node also has an RF output that may be connected to a coax splitter to provide multiple service options for the subscriber.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described claims are to be considered in all respects only as illustrative and not restrictive. Examples of the scope of the present subject matter can be found in the following claims.

What is claimed is:

1. A cable demarcation enclosure, comprising:
a base, comprising an interior cavity;
a cover, selectively enclosing the base; and
a tray, removably attachable to the base, within the interior cavity of the base, and comprising a mounting plate, having a first side and a second side that is opposite the first side, an outer ring coupled to and protruding from the second side of the mounting plate, and an axle coupled to and protruding from the second side of the mounting plate at a center of the outer ring;
wherein the outer ring is fixed to the mounting plate such that the outer ring does not move relative to the mounting plate.

2. The cable demarcation enclosure according to claim 1, wherein the outer ring comprises a cable inlet and is circumferentially closed except for the cable inlet.

3. The cable demarcation enclosure according to claim 1, further comprising a cable winder that is rotatably coupleable to the axle, such that when rotatably coupled to the axle the cable winder is rotatable relative to the outer ring.

4. The cable demarcation enclosure according to claim 3, wherein:
the cable winder comprises a spool; and
when the cable winder is rotatably coupled to the axle, the spool is located within the outer ring and is rotatable relative to the outer ring.

5. The cable demarcation enclosure according to claim 4, wherein the spool comprises a cable-retention channel sized to retain a network communications cable with an interference fit.

6. The cable demarcation enclosure according to claim 5, wherein:
the spool comprises a circular wall;
portions of the circular wall overlap each other; and
the cable-retention channel is defined between the portions of the circular wall that overlap each other.

7. The cable demarcation enclosure according to claim 4, wherein:
the cable winder further comprises an axle receptacle that is configured to receive the axle and is centered relative to the spool;
the axle comprises resilient prongs that engage the axle receptacle to retain the axle receptacle on the axle; and
the resilient prongs are resiliently flexible to enable selective coupling of the cable winder to the axle and to enable selective decoupling of the cable winder from the axle.

8. The cable demarcation enclosure according to claim 7, wherein:
the axle receptacle comprises at least one notch; and
the at least one notch is configured to engage the resilient prongs such that rotation of the cable winder relative to the outer ring, in a winding direction, is un-obstructed and rotation of the cable winder relative to the outer ring, in an unwinding direction opposite the winding direction, is obstructed.

9. The cable demarcation enclosure according to claim 3, wherein:
the tray further comprises overhead retainers that are releasably coupleable with the mounting plate; and
the overhead retainers are releasably coupled with the mounting plate, the overhead retainers extend parallel with and offset from the second side of mounting plate and extend in a direction from the outer ring toward the axle.

10. The cable demarcation enclosure according to claim 1, wherein:
the first side of the mounting plate faces the cover and the second side faces away from the cover when the cover encloses the base and when the tray is attached to the base; and
when the tray is attached to the base, the tray divides the interior cavity into a first portion, in which the outer ring is located, and a second portion, in which the at least one electronic device is located.

11. The cable demarcation enclosure according to claim 1, wherein:
the base further comprises a service-provider-cable slot and a service-user-cable slot formed in the base;
the service-provider-cable slot and the service-user-cable slot are open ended; and
the cover closes open ends of the service-provider-cable slot and the service-user-cable slot when the cover encloses the base.

12. The cable demarcation enclosure according to claim 11, further comprising a gasket in the interior cavity of the base and engaged with the service-provider-cable slot and the service-user-cable slot to seal off the service-provider-cable slot and the service-user-cable slot from the interior cavity of the base.

13. The cable demarcation enclosure according to claim 12, wherein:
the gasket comprises slits extending through a thickness of the gasket;
a first one of the slits is aligned with the service-provider-cable slot; and
a second one of the slits is aligned with the service-user-cable slot.

14. The cable demarcation enclosure according to claim 12, wherein:
the base further comprises a gasket retainer in the interior cavity of the base;
the gasket retainer compresses the gasket in a horizontal direction, parallel to the first side of the mounting plate, to prevent movement of the gasket in the horizontal direction relative to the base; and
the gasket retainer comprises overhang features in engagement with the gasket to prevent movement of the gasket in a vertical direction, perpendicular to the first side of the mounting plate, relative to the base.

15. The cable demarcation enclosure according to claim 1, wherein the tray further comprises:
a second axle coupled to and protruding from the first side of the mounting plate; and
a spool that is rotatably coupled to the second axle such that the spool is rotatable relative to the mounting plate.

16. The cable demarcation enclosure according to claim 15, wherein the spool comprises:
a first end plate;
a second end plate; and
a hub, coupling together and spanning between the first end plate and the second end plate,
wherein the first end plate and the second end plate are releasably attached to the hub.

17. The cable demarcation enclosure according to claim 16, wherein:
the hub comprises resilient prongs;

the first end plate comprises first-plate slots;
the second end plate comprises second-plate slots; and
the resilient prongs are insertable into and engageable with corresponding ones of the first-plate slots and the second-plate slots to releasably attach the first end plate and the second end plate to the hub.

18. The cable demarcation enclosure according to claim 1, further comprising an optical-cable splice assembly coupled to the first side of the mounting plate and located within the interior cavity of the base.

19. A cable demarcation enclosure, comprising:
a base, comprising an interior cavity a service-provider-cable slot and a service-user-cable slot formed in the base;
a cover, selectively enclosing the base; and
a tray, removably attachable to the base, within the interior cavity of the base, and comprising:
  a mounting plate, having a first side and a second side that is opposite the first side;
  an outer ring coupled to and protruding from the second side of the mounting plate;
  a first axle coupled to and protruding from the second side of the mounting plate at a center of the outer ring;
  a second axle coupled to and protruding from the first side of the mounting plate; and
  a spool rotatably coupled to the second axle such that the spool is rotatable relative to the mounting plate.

20. The cable demarcation system according to claim 19, further comprising a cable winder comprising a second spool, wherein the cable winder is rotatably coupleable to the first axle.

21. A method of electrically connecting a provider cable and a user cable at a demarcation point, the method comprising:

securing an end portion of the provider cable in a cable-retention channel of a spool of a cable winder;

rotating the cable winder about an axle coupled to and protruding from a second side of a mounting plate of a tray, such that the provider cable is wound about the spool of the cable winder;

after the provider cable is wound about the spool of the cable winder and the provider cable is in tension about the spool, releasing the cable winder to uncoil the provider cable from the spool and to urge the provider cable against an outer ring fixed to the second side of the mounting plate of the tray;

after the provider cable is urged against the outer ring, releasing the end portion of the provider cable from the cable-retention channel and removing the cable winder from the axle;

after the cable winder is removed from the axle, inserting the tray, with the provider cable urged against the outer ring, into the interior cavity of a base;

connecting the end portion of the provider cable to the user cable at a location within the interior cavity and on a first side of the mounting plate that is opposite the second side; and enclosing the base with a cover.

* * * * *